(12) United States Patent
Chen

(10) Patent No.: US 9,693,077 B2
(45) Date of Patent: Jun. 27, 2017

(54) CONTROLLING SUB PREDICTION UNIT (SUB-PU) MOTION PARAMETER INHERITANCE (MPI) IN THREE DIMENSIONAL (3D) HEVC OR OTHER 3D CODING

(71) Applicant: QUALCOMM Incorporated, San Diego, CA (US)

(72) Inventor: Ying Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 280 days.

(21) Appl. No.: 14/567,564

(22) Filed: Dec. 11, 2014

(65) Prior Publication Data

US 2015/0172716 A1    Jun. 18, 2015

Related U.S. Application Data

(60) Provisional application No. 61/916,068, filed on Dec. 13, 2013.

(51) Int. Cl.
*H04N 7/18* (2006.01)
*H04N 19/597* (2014.01)
(Continued)

(52) U.S. Cl.
CPC ......... *H04N 19/597* (2014.11); *H04N 19/105* (2014.11); *H04N 19/139* (2014.11);
(Continued)

(58) Field of Classification Search
CPC ......... H04N 19/0003; H04N 19/00072; H04N 19/00218
(Continued)

(56) References Cited

U.S. PATENT DOCUMENTS

2012/0069905 A1    3/2012  Kato et al.
2012/0134416 A1    5/2012  Lin et al.
(Continued)

FOREIGN PATENT DOCUMENTS

CN    102301714 A    12/2011
EP    2164264 A1    3/2010
(Continued)

OTHER PUBLICATIONS

Niegand et al., "WD1: Working Draft 1 of High-Efficiency Video Coding," JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.
(Continued)

*Primary Examiner* — Andy Rao
(74) *Attorney, Agent, or Firm* — Shumaker & Sieffert, P.A.

(57) ABSTRACT

In general, the disclosure describes techniques for coding depth blocks in video data. A video coding device may determine a size of a sub-prediction unit (sub-PU) for motion parameter inheritance (MPI) in a depth prediction unit (depth PU). The depth PU may comprise one or more sub-PUs, each sub-PU having equal size. Distinct motion information can be inherited for each sub-PU from a texture block co-located to the sub-PU. The device may encode each sub-PU based on MPI corresponding to texture blocks co-located with the sub-PUs and generate a syntax element that indicates the size of each sub-PU for MPI. The device may further receive the syntax element, and, upon receiving an index value that indicates a sub-PU MPI mode, inherit MPI for each sub-PU based on the corresponding texture blocks.

30 Claims, 11 Drawing Sheets

(51) Int. Cl.

| | |
|---|---|
| *H04N 19/105* | (2014.01) |
| *H04N 19/139* | (2014.01) |
| *H04N 19/176* | (2014.01) |
| *H04N 19/196* | (2014.01) |
| *H04N 19/52* | (2014.01) |
| *H04N 19/503* | (2014.01) |
| *H04N 19/70* | (2014.01) |
| *H04N 19/46* | (2014.01) |

(52) U.S. Cl.
CPC ......... *H04N 19/176* (2014.11); *H04N 19/196* (2014.11); *H04N 19/46* (2014.11); *H04N 19/503* (2014.11); *H04N 19/52* (2014.11); *H04N 19/70* (2014.11)

(58) Field of Classification Search
USPC ........................................ 375/240.11–240.28
See application file for complete search history.

(56) References Cited

U.S. PATENT DOCUMENTS

| | | |
|---|---|---|
| 2015/0003521 A1 | 1/2015 | Thirumalai et al. |
| 2015/0003529 A1 | 1/2015 | Thirumalai et al. |
| 2015/0030073 A1 | 1/2015 | Chen et al. |
| 2015/0043657 A1* | 2/2015 | Choi .................... H04N 19/597 375/240.26 |

FOREIGN PATENT DOCUMENTS

| | | |
|---|---|---|
| JP | 2013529878 A | 7/2013 |
| WO | 2009123248 A1 | 10/2009 |

OTHER PUBLICATIONS

Niegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.

Niegand et al., "WD3: Working Draft 3 of High-Efficiency Video Coding," Document JCTVC-E603, 5th Meeting: Geneva, CH, Mar. 16-23, 2011 (Joint Collaborative Team on Video Coding of ISO/IEC JTC1/SC29/WG11 and ITU-T SG.16); May 9, 2015, 193 pp.

Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WVG11 and ITU-T SG.16); JCTVC-F803_d2, Oct. 4, 2011, 226 pp.

Bross et al., "WD5: Working Draft 5 of High-Efficiency Video Coding," 7th Meeting: Geneva, CH, Nov. 21-30, 2011, (Joint Collaborative Team on Video Coding of ISO/IEC JTC1/SC29/WG11 and ITU-T SG.16); JCTVC-G1103_d2, Dec. 30, 2011, 214 pp.

Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and TU-T SG.16); JCTVC-H1003, Apr. 2, 2012, 259 pp.

Bross et al., "High efficiency video coding (HEVC) text specification draft 7," 9th Meeting: Geneva, CH, Apr. 27 through May 7, 2012, (Joint Collaborative Team on Video Coding of ISO/IEC JTC1/SC29/WG11 and TU-T SG.16); JCTVC-I1003_d2, Jun. 1, 2012, 290 pp.

Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.

Bross et al., "High Efficiency Video Coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.

Bross et al., "High Efficiency Video Coding (HEVC) text specification draft 10 (for FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Chen et al., "CE2: Sub-PU based MPI," JCT-3V Meeting; Jan. 11-17, 2014, San Jose, CA, USA (the Joint Collaborative Team on 3D Video Coding Extension Development of ISO/IEC JTC1/SC29/WG11 and ITU-T SG.16 ), Jan. 3, 2014, Retrieved from the Internet: URL: http://phenix.int-evry.fr/jct2/,, No. JCT3V-G0119, XP030131892, 3 pp.

Chen et al., "Proposed text for JCT3V-G0119-based on 3D-HEVC Draft Text 2," Joint Collaborative Team on 3D Video Coding Extensions of ITU-T SG 16 WP 3 and ISO/IEC JTC 1/SC 29/WG 11; Jan. 11-17, 2014; 7th Meeting: San Jose, CA, USA; Document: X,P A JCT3V-G0119, Jan. 3, 2014, Retrieved from the Internet: URL:http://phenix.int-evry.frjjct3vfdoc_en d user/current document.php?id=1732, XP055167117, 5 pp.

Zhao et al., "CE3 related: Sub-PU based MPI," JCT-3V Meeting; Oct. 25-Nov. 1, 2013, Geneva, CH (the Joint Collaborative Team on 3D Video Coding Extension Development of ISO/IEC JTC1/SC29/WG11 and ITU-T SG.16 ), Oct. 18, 2013, Retrieved from the Internet: URL: http://phenix.int-evry.fr/jct2/, No. JCT3V-F0128, 3 pp.

Tian et al.,"CE1.h: Backward View Synthesis Prediction using Neighbouring Blocks," JCT-3V Meeting; MPEG Meeting; Jan. 16-23, 2013; Geneva, CH; (the Joint Collaborative Team on 3D Video Coding Extension Development of ISO/IEC JTC1/SC29/WG11 and ITU-T SG.16 ); URL: http://phenix.int-evry.fr/jct2/, No. JCT3V-C0152, Jan. 10, 2013, XP030130568, 5 pp.

Tech et al., "3D-HEVC Draft Text 2," Geneva, CH (the Joint Collaborative Team on 3D Video Coding Extension Development of ISO/IEC JTC1/SC29/WG11 and ITU-T SG.16), Oct. 25-Nov. 1, 2013, Document: JCT3V-F1001-v2, Dec. 5, 2013, 93 pp.

An et al., "3D-CE3.h related: Sub-PU level inter-view motion prediction," JCT-3V Meeting; Jul. 27-Aug. 2, 2013; Vienna, AT; (the Joint Collaborative Team on 3D Video Coding Extension Development of ISO/IEC JTC1/SC29/WG11 and ITU-T SG.16 ); URL: http://phenix.int-evry.fr/jct2/ No. JCT3V-E0184, XP030131217, Jul. 19, 2013, 4 pp.

He et al., "Enhanced motion parameter inheritance for depth coding in 3D-HEVC," JCT-3V Meeting; Jul. 27-Aug. 2, 2013; Vienna, AT; (the Joint Collaborative Team on 3D Video Coding Extension Development of ISO/IEC JTC1/SC29/WG11 and ITU-T SG.16 ); URL: http://phenix.int-evry.fr/jct2p No. JCT3V-E0229, Jul. 19, 2013, XP030131282, 4 pp.

Kang et al., "3D-CE5.h related: Improvements for disparity vector derivation," JCT-3V Meeting; MPEG Meeting; Oct. 13-19, 2012; Shanghai, CN; (the Joint Collaborative Team on 3D Video Coding Extension Development of ISO/IEC JTC1/SC29/WG11 and ITU-T SG.16); URL: http://phenix.int-evry.fr/jct2/, No. JCT3V-B0047, Oct. 10, 2012, XP030130228, 4 pp.

Oh et al., "H.264-Based Depth Map Sequence Coding Using Motion Information of Corresponding Texture Video," Gwangju

(56) References Cited

OTHER PUBLICATIONS

Institute of Science and Texchnology (GIST), Korea, 2006, pp. 898-907 (Applicant points out, in accordance with MPEP 609.04(a), that the year of publication, 2006, is sufficiently earlier than the effective U.S. filing date, Dec. 13, 2013, so that the particular month of publication is not in issue.).
Sung et al., "3D-CE5.h: Simplification of disparity vector derivation for HEVC-based 3D video coding," JCT-3V Meeting; 101. MPEG Meeting; Jul. 16-20, 2012; Stockholm, SE; (the Joint Collaborative Team on 3D Video Coding Extension Development of ISO/IEC JTC1/SC29/WG11 and ITU-T SG.16); URL: http://phenix.int-evry.fr/jct2/, No. JCT3V-A0126, Jul. 14, 2012, XP030130125, 4 pp.
Tech et al., "3D-HEVC Test Model 4," JCT-3V Meeting; Incheon, KR, Apr. 20-26, 2013; (The Joint Collaborative Team on 3D Video Coding Extension Development of ISO/IEC JTC1/SC29/WG11 and ITU-T SG.16), No. JCT3V-D1005_v1, Jun. 17, 2013, XP030130998, 88 pp.
Tech et al., "3D-HEVC Test Model 2," Joint Collaborative Team on 3D Video Coding Extension Development of ITU-T SG 16 WP 3 and ISO/IEC JTC 1/SC 29/WG 11, Oct. 13-19, 2012; Document: JCT3V-B1005_d0, Dec. 23, 2012; 2nd Meeting: Shanghai, CN, 118 pp., XP030130414.
Tech et al., "3D-HEVC Test Model 3," JCT-3V Meeting; MPEG Meeting; Jan. 17-23, 2013; Geneva, CH; (the Joint Collaborative Team on 3D Video Coding Extension Development of ISO/IEC JTC1/SC29/WG11 and ITU-T SG.16); URL: http://phenix.int-evry.fr/jct2/, No. JCT3V-C1005_d0, Mar. 15, 2013; XP030130664, 52 pp.
Tech et al., "3D-HEVC Test Model 4," JCT-3V Meeting; Incheon, KR; Apr. 20-26, 2013; (the Joint Collaborative Team on 3D Video Coding Extension Development of ISO/IEC JTC1/SC29/WG11 and ITU-T SG.16), No. JCT3V-D1005_v1, Jun. 17, 2013, XP030130998, 56 pp.
Tech et al., "MV-HEVC Draft Text 4," JCT-3V Meeting; Apr. 20-26, 2013; Incheon, KR; (the Joint Collaborative Team on 3D Video Coding Extension Development of ISO/IEC JTC1/SC29/WG11 and ITU-T SG.16); URL: http://phenix.int-evry.fr/jct2/, No. JCT3V-D1004-d0, May 13, 2013, XP030130982, 50 pp.
Zhang et al., "CE4: Advanced residual prediction for multiview coding," Apr. 20-26, 2013; (The Joint Collaborative Team on 3D Video Coding Extension Development of ISO/IEC JTC1/SC29/WG11 and ITU-T SG.16), Apr. 20, 2013, Document: JCT3V-D0177_proposed_text_r1, 6 pp.
Zhang et al., "Proposed text for JCT3V-00049 based on 3D-HEVC Text Model 2," Jan. 17-23, 2013; JCT-3V Meeting; MPEG Meeting; Jan. 16, 2013; Shanghai, CN; Document: JCT3V-00049_proposed text; (The Joint Collaborative Team on 3D Video Coding Extension Development of ISO/IEC JTC1/SC29/WG11 and ITU-T SG.16); 6 pp.
Zhang et al., "3D-CE4: Advanced residual prediction for multiview coding," Jan. 17-23, 2013; Joint Collaborative Team on 3D Video Coding Extension Development of ITU-T SG 16 WP 3 and ISO/IEC JTC 1/SC 29/WG 11, JCT3V-C0049, Oct. 21, 2013; 3rd Meeting: Geneva, CH, 5 pp.
Zhang et al., "CE4: Advanced residual prediction for multiview coding," JCT-3V Meeting; Apr. 20-26, 2013; Incheon, KR; (the Joint Collaborative Team on 3D Video Coding Extension Development of ISO/IEC JTC1/SC29/WG11 and ITU-T SG.16 ); URL: http://phenix.int-evry.fr/jct2/, No. JCT3V-D0177, XP030130841, Apr. 13, 2013, 10 pp.
International Search Report and Written Opinion from International Application No. PCT/US2014/070041, dated Feb. 11, 2015, 15 pp.
International Preliminary Report on Patentability from International Application No. PCT/US2014/070041, dated Feb. 9, 2016, 10 pp.
Second Written Opinion from International Application No. PCT/US2014/070041, dated Nov. 24, 2015, 6 pp.
Response to Written Opinion dated Feb. 11, 2015, from International Application No. PCT/US2014/070041, filed on Oct. 12, 2015, 4 pp.
Response to Second Written Opinion dated Nov. 24, 2015, from International Application No. PCT/US2014/070041, filed on Jan. 22, 2016, 5 pp.

* cited by examiner

CONTROLLING SUB PREDICTION UNIT (SUB-PU) MOTION PARAMETER INHERITANCE (MPI) IN THREE DIMENSIONAL (3D) HEVC OR OTHER 3D CODING

This application claims the benefit of U.S. Provisional Application No. 61/916,068, filed Dec. 13, 2013, the entire content of which is incorporated herein by reference.

TECHNICAL FIELD

This disclosure relates to video coding and compression, and more specifically, coding techniques that may be used in coding three-dimensional (3D) video.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the recently developed High Efficiency Video Coding (HEVC) standard, and extensions of such standards, to transmit, receive and store digital video information more efficiently.

Video compression techniques perform spatial (intra-picture) prediction and/or temporal (inter-picture) prediction to reduce or remove redundancy inherent in video sequences. For block-based video coding, a video slice may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

A multi-view coding bitstream may be generated by encoding views, e.g., from multiple perspectives. Multi-view coding may allow a decoder to choose between different views, or possibly render multiple views. Moreover, some three-dimensional (3D) video techniques and standards that have been developed, or are under development, make use of multiview coding aspects. Three dimensional video is also referred to as "3DV."

For example, different views may transmit left and right eye views to support 3D video. Alternatively, some 3D video coding processes may apply so-called multiview plus depth coding. In multiview plus depth coding, a 3D video bitstream may contain not only texture view components, but also depth view components. For example, each view may comprise one texture view component and one depth view component.

A Joint Collaboration Team on 3D Video Coding (JCT-3C) of VCEG and MPEG has developed a 3D video standard referred to as "high efficiency video coding (HEVC)," for which part of the standardization efforts includes the standardization of the multiview video codec based on HEVC (MV-HEVC) and another part for 3D Video coding based on HEVC (3D-HEVC). For 3D-HEVC, a variety of coding tools, including those in coding unit/prediction unit level, for both texture and depth views may be included and supported.

SUMMARY

In general, the disclosure describes techniques for encoding and decoding depth blocks in video data. A video coding device may determine a size of a sub-prediction unit (sub-PU) for motion parameter inheritance (MPI) in a depth prediction unit (depth PU). The depth PU may comprises one or more sub-PUs, wherein each sub-PU has equal size. Distinct motion information can be inherited for each sub-PU from a texture block co-located to the respective sub-PU. The device may encode each sub-PU of the depth block based on MPI corresponding to texture blocks co-located with each of the sub-PUs and generate a syntax element that indicates the size of each sub-PU for MPI. The device may further receive the syntax element, and, upon receiving an index value that indicates a sub-PU MPI mode, inherit MPI for each sub-PU of the depth block based on corresponding texture blocks co-located with each of the sub-PUs.

In one example, the disclosure is directed to a method of decoding a depth block in which a video coding device receives a syntax element that indicates a size of a sub-prediction unit (sub-PU) for motion parameter inheritance (MPI) in a depth prediction unit (depth PU). The depth PU comprises one or more sub-PUs. Each sub-PU has a size equal to the size indicated by the syntax element. Distinct motion information can be inherited for each sub-PU from a texture block co-located to the respective sub-PU. Upon receiving an index value that indicates a sub-PU MPI mode, the video coding device further inherits MPI for each of the sub-PUs of the depth block based at least in part on corresponding texture blocks co-located with each of the sub-PUs.

In another example, the disclosure is directed to a device for coding a depth block, the device comprising a memory configured to store data associated with the depth block and one or more processors. The one or more processors are configured to receive a syntax element that indicates a size of a sub-prediction unit (sub-PU) for motion parameter inheritance (MPI) in a depth prediction unit (depth PU). The depth PU comprises one or more sub-PUs. Each sub-PU has a size equal to the size indicated by the syntax element. Distinct motion information can be inherited for each sub-PU from a texture block co-located to the respective sub-PU. Upon receiving an index value that indicates a sub-PU MPI mode, the one or more processors are further configured to inherit MPI for each of the sub-PUs of the depth block based at least in part on corresponding texture blocks co-located with each of the sub-PUs.

In another example, the disclosure is directed to a method of encoding a depth block in which a video coding device determines a size of a sub-prediction unit (sub-PU) for motion parameter inheritance (MPI) in a depth prediction unit (depth PU). The depth PU comprises one or more sub-PUs. Each sub-PU has equal size. Distinct motion information can be inherited for each sub-PU from a texture block co-located to the respective sub-PU. The video coding device encodes each sub-PU of the depth block based at least in part based at least in part on MPI corresponding to texture blocks co-located with each of the sub-PUs. The video coding device further generates a syntax element that indicates the size of each sub-PU for MPI in the depth PU.

In another example, the disclosure is directed to a device for coding a depth block, the device comprising a memory configured to store data associated with the depth block and one or more processors. The one or more processors are configured to determine a size of a sub-prediction unit (sub-PU) for motion parameter inheritance (MPI) in a depth prediction unit (depth PU). The depth PU comprises one or more sub-PUs. Each sub-PU has equal size. Distinct motion information can be inherited for each sub-PU from a texture block co-located to the respective sub-PU. The one or more processors are configured to encode each sub-PU of the depth block based at least in part based at least in part on MPI corresponding to texture blocks co-located with each of the sub-PUs. The one or more processors are further configured to generate a syntax element that indicates the size of each sub-PU for MPI in the depth PU.

The details of one or more examples of the disclosure are set forth in the accompanying drawings and the description below. Other features, objects, and advantages of the disclosure will be apparent from the description and drawings, and from the claims.

DETAILED DESCRIPTION

This disclosure is related to three-dimensional 3D video coding based on advanced codecs, including depth coding techniques. The proposed coding techniques are related to controlling of motion prediction in 3D-HEVC, more specifically on depth coding.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The latest joint draft of MVC is described in "Advanced video coding for generic audiovisual services," ITU-T Recommendation H.264, March 2010.

In addition, there is a video coding standard, namely High Efficiency Video Coding (HEVC) (version JCTVC-L1003_v11), developed by the Joint Collaboration Team on Video Coding (JCT-VC) of ITU-T Video Coding Experts Group (VCEG) and ISO/IEC Motion Picture Experts Group (MPEG).

Figure 1:
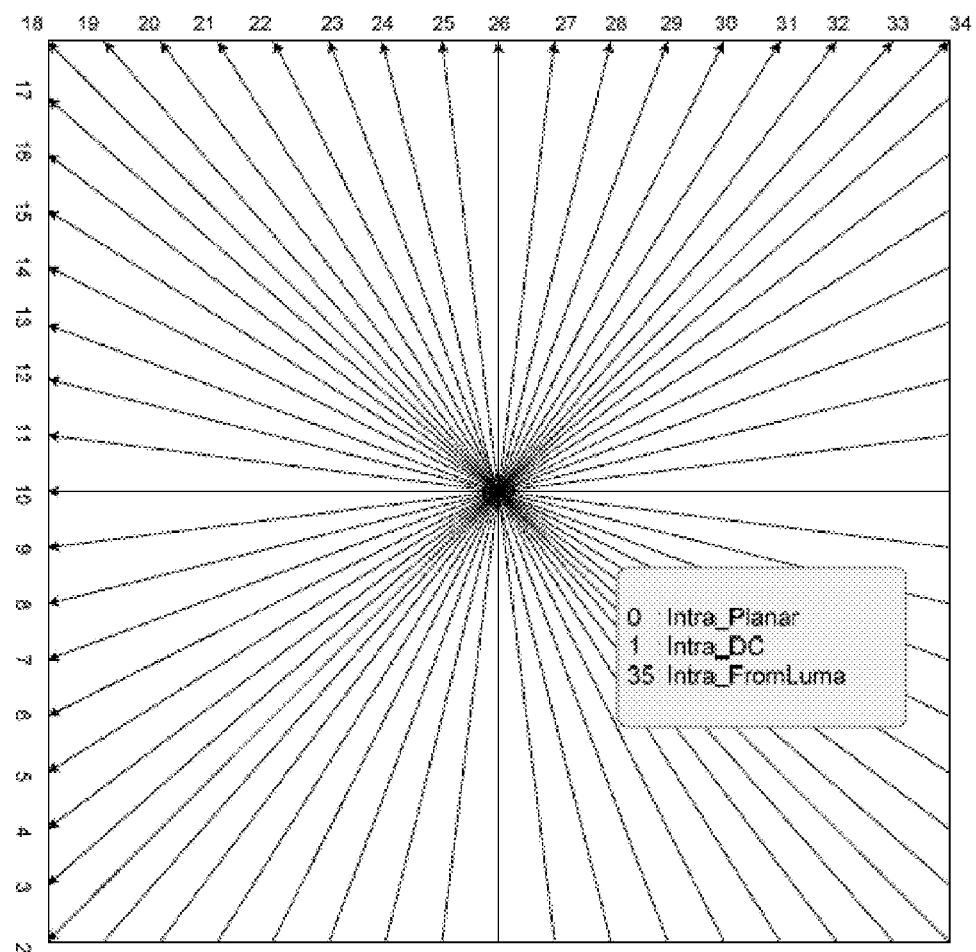
FIG. 1 is a conceptual illustration showing intra prediction modes in HEVC.

In the current HEVC (version JCTVC-L1003_v11), for the luma component of each Prediction Unit (PU), an intra prediction method is utilized with 33 angular prediction modes (indexed from 2 to 34), DC mode (indexed with 1) and Planar mode (indexed with 0), as shown in FIG. 1. In particular, FIG. 1 illustrates Intra prediction modes in HEVC.

Typically a reference picture list construction for the first or the second reference picture list of a B picture includes two steps: reference picture list initialization and reference picture list reordering (i.e., modification of the reference picture list). The reference picture list initialization is an explicit mechanism or process that puts (i.e., stores) the reference pictures in the reference picture memory (also known as decoded picture buffer) as a list based on the order of POC (Picture Order Count, aligned with display order of a picture) values. The reference picture list reordering mechanism can modify the position of a picture that was put in the reference picture list during the reference picture list initialization to any new position within the reference picture list. The reference picture list reordering mechanism can also put any reference picture in the reference picture memory in any other position in the reference picture memory even though the picture doesn't belong to the initialized reference picture list. Some pictures, after the reference picture list reordering (i.e., modification of the reference picture list), may be put in a position that is sequentially later in the list. However, if a position of a picture exceeds the number of active reference pictures of the list, the picture is not considered as an entry of the final reference picture list. The number of active reference pictures of may be signaled in the slice header for each list. After reference picture lists (namely RefPicList0 and RefPicList1, if available) are constructed, a reference index to a reference picture list can be used to identify any reference picture included in the reference picture list.

To get (i.e., determine) a Temporal Motion Vector Predictor (TMVP), firstly a co-located picture is to be identified. If the current picture is a B slice, a collocated_from_l0_flag is signaled in slice header to indicate whether the co-located picture is from RefPicList0 or RefPicList1. After a reference picture list is identified, collocated_ref_idx, which is a syntax element signaled in slice header, is used to identify the picture in the reference picture list. A co-located prediction unit (PU) is then identified by checking the co-located picture. Either the motion of the right-bottom PU of the coding unit (CU) containing this PU or the motion of the right-bottom PU within the center PUs of the CU containing this PU is used as the picture in the reference picture list.

When motion vectors identified by the above process are used to generate a motion candidate for AMVP or merge mode, they may be scaled based on the temporal location (reflected by POC). Note that the target reference index of all possible reference picture lists for the temporal merging candidate derived from TMVP may be set to 0, while for AMVP, the target reference index is set equal to the decoded reference index.

In HEVC, the SPS includes a flag sps_temporal_mvp_enable_flag, and the slice header includes a flag pic_temporal_mvp_enable_flag when sps_temporal_mvp_enable_flag is equal to 1. When both pic_temporal_mvp_enable_flag and temporal_id are equal to 0 for a particular picture, no motion vector from pictures before that particular picture in decoding order would be used as a temporal motion vector predictor in decoding of the particular picture or a picture after the particular picture in decoding order.

Currently, a Joint Collaboration Team on 3D Video Coding (JCT-3C) of VCEG and MPEG is developing a 3DV standard based on HEVC, for which part of the standardization efforts includes the standardization of the multiview video codec based on HEVC (MV-HEVC) and another part for 3D Video coding based on HEVC (3D-HEVC). For MV-HEVC, it should be guaranteed that there are only high-level syntax (HLS) changes in it, such that no module in the CU/PU level in HEVC needs to be re-designed and can be fully reused for MV-HEVC. For 3D-HEVC, new coding tools, including those in coding unit/prediction unit level, for both texture and depth views may be included and supported. The latest reference software description as well as the working draft of 3D-HEVC is to be available as follows: Gerhard Tech, Krzysztof Wegner, Ying Chen, Sehoon Yea, "3D-HEVC Test Model 4," JCT3V-F1001, Joint Collaborative Team on 3D Video Coding Extension Development of ITU-T SG 16 WP 3 and ISO/IEC JTC 1/SC 29/WG 11, 6th Meeting.

To further improve the coding efficiency, two new technologies (namely "inter-view motion prediction" and "inter-view residual prediction") have been adopted in the latest reference software. To enable these two coding tools, the first step is to derive a disparity vector. The disparity vector is used either to locate the corresponding block in the other view for inter-view motion/residual prediction or to be converted to a disparity motion vector for inter-view motion prediction.

An implicit disparity vector (IDV) is generated when a PU employs inter-view motion vector prediction, i.e., the candidate for AMVP or merge modes is derived from a corresponding block in the other view with the help of a disparity vector. Such a disparity vector is called IDV. IDV is stored to the PU for the purpose of disparity vector derivation.

To derive a disparity vector, the method called Neighboring Blocks based Disparity Vector (NBDV) is used in current 3D-HTM. NBDV utilizes disparity motion vectors from spatial and temporal neighboring blocks. In NBDV, the motion vectors of spatial or temporal neighboring blocks are checked in a fixed checking order. Once a disparity motion vector or an IDV is identified, the checking process is terminated and the identified disparity motion vector is returned and converted to the disparity vector which will be used in inter-view motion prediction and inter-view residue prediction. If no such disparity vector is found after checking all of the pre-defined neighboring blocks, a zero disparity vector will be used for the inter-view motion prediction while inter-view residual prediction will be disabled for the corresponding prediction unit (PU).

Five spatial neighboring blocks are used for the disparity vector derivation. They are: the below-left, left, above-right, above and above-left blocks of current prediction unit (PU), denoted by $A_0$, $A_1$, $B_0$, $B_1$ or $B_2$, as defined in FIG. 8-33 of the HEVC specification.

Figure 2:
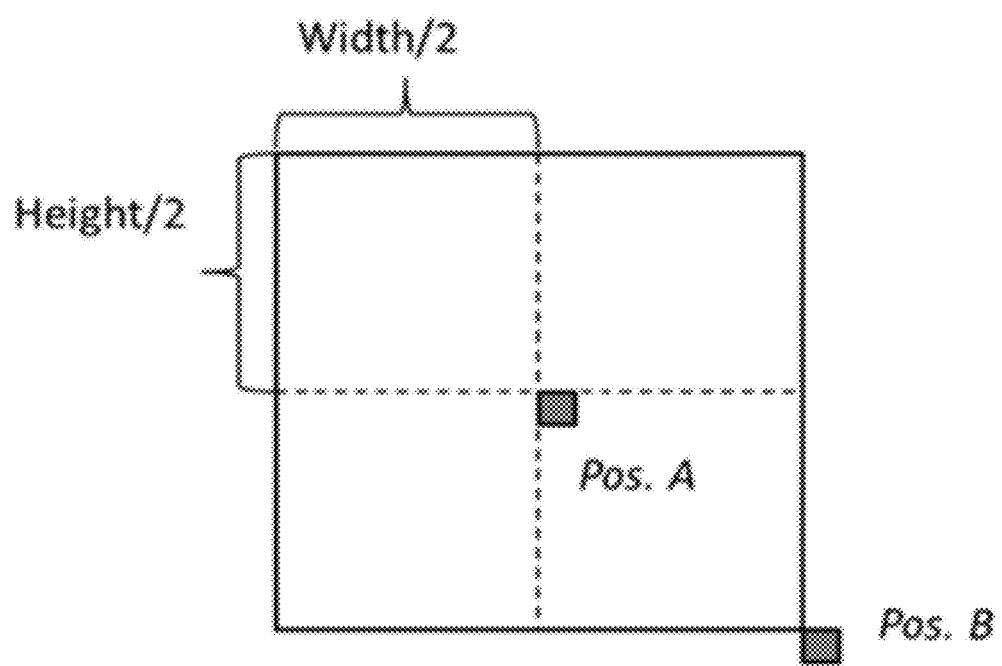
FIG. 2 is a conceptual illustration showing temporal neighboring blocks in NBDV.

Up to two reference pictures from current view, the co-located picture and the random-access picture or the reference picture with the smallest POC difference and smallest temporal ID are considered for temporal block checks. Random-access is first checked, followed by the co-located picture. For each candidate picture, two candidate blocks are checked. The first candidate block checked is the Center block (CR), or the center 4×4-pixel block of the co-located region of the current PU (see 'Pos. A' in FIG. 2). The second candidate block checked is the Bottom Right block (BR): Bottom-right 4×4-pixel block of co-located region of the current PU (see 'Pos. B' in FIG. 2), which shows temporal neighboring blocks in NBDV.

Whether DMVs are used is firstly checked for all the spatial/temporal neighboring blocks, followed by IDVs. Spatial neighboring blocks are firstly checked, followed by temporal neighboring blocks. Five spatial neighboring blocks are checked in the order of $A_1$, $B_1$, $B_0$, $A_0$ and $B_2$. If one of the neighboring blocks uses DMV, the checking process is terminated and the corresponding DMV will be used as the final disparity vector. For each candidate picture, the two blocks are checked in order, CR and BR for the first non-base view or BR, CR for the second non-base view. If one of the neighboring blocks uses DMV, the checking process is terminated and the corresponding DMV will be used as the final disparity vector. Five spatial neighboring blocks are checked in the order of $A_0$, $A_1$, $B_0$, $B_1$ and $B_2$. If one of the neighboring blocks uses IDV and is coded as skip/merge mode, the checking process is terminated and the corresponding IDV will be used as the final disparity vector.

The disparity vector, generated from the NBDV scheme could be further refined using the information in the coded depth map. That is, the accuracy of the disparity vector could be enhanced by taking benefit of the information coded base view depth map. The refinement steps are described as follows. First, a video coding device locates a corresponding depth block by the derived disparity vector in the previously coded reference depth view, such as the base view. The size of the corresponding depth block is the same as that of current PU. Next, a disparity vector is calculated from the co-located depth block, from the maximum value of the four corner depth values. This is set equal to the horizontal component of a disparity vector, while the vertical component of the disparity vector is set to 0.

This new disparity vector is called a depth oriented neighboring block based disparity vector (DoNBDV). The disparity vector from NBDV scheme is then replaced by this newly derived disparity vector from the DoNBDV scheme for inter-view candidate derivation for the AMVP and merge modes. Note that the unrefined disparity vector is used for inter-view residual prediction. In addition, the refined disparity vector is stored as the motion vector of one PU if the refined disparity vector is coded with backward VSP mode.

The backward-warping VSP approach as proposed in JCT3V-C0152 was adopted in the 3rd JCT-3V meeting. The basic idea of this backward-warping VSP is the same as (or similar to) the block-based VSP in 3D-AVC. Both of these two techniques use the backward-warping and block-based VSP to avoid transmitting the motion vector differences and use more precise motion vectors. Implementation details are different due to different platforms. In this disclosure, BVSP refers to the backward-warping VSP approach in 3D-HEVC.

In 3D-HTM, texture first coding is applied in common test conditions. Therefore, the corresponding non-base depth view is unavailable when decoding one non-base texture view. Therefore, the depth information is estimated and used to perform BVSP.

In order to estimate the depth information for a block, it is proposed to first derive a disparity vector from the neighboring blocks, and then use the derived disparity vector to obtain a depth block from a reference view.

Figure 3:
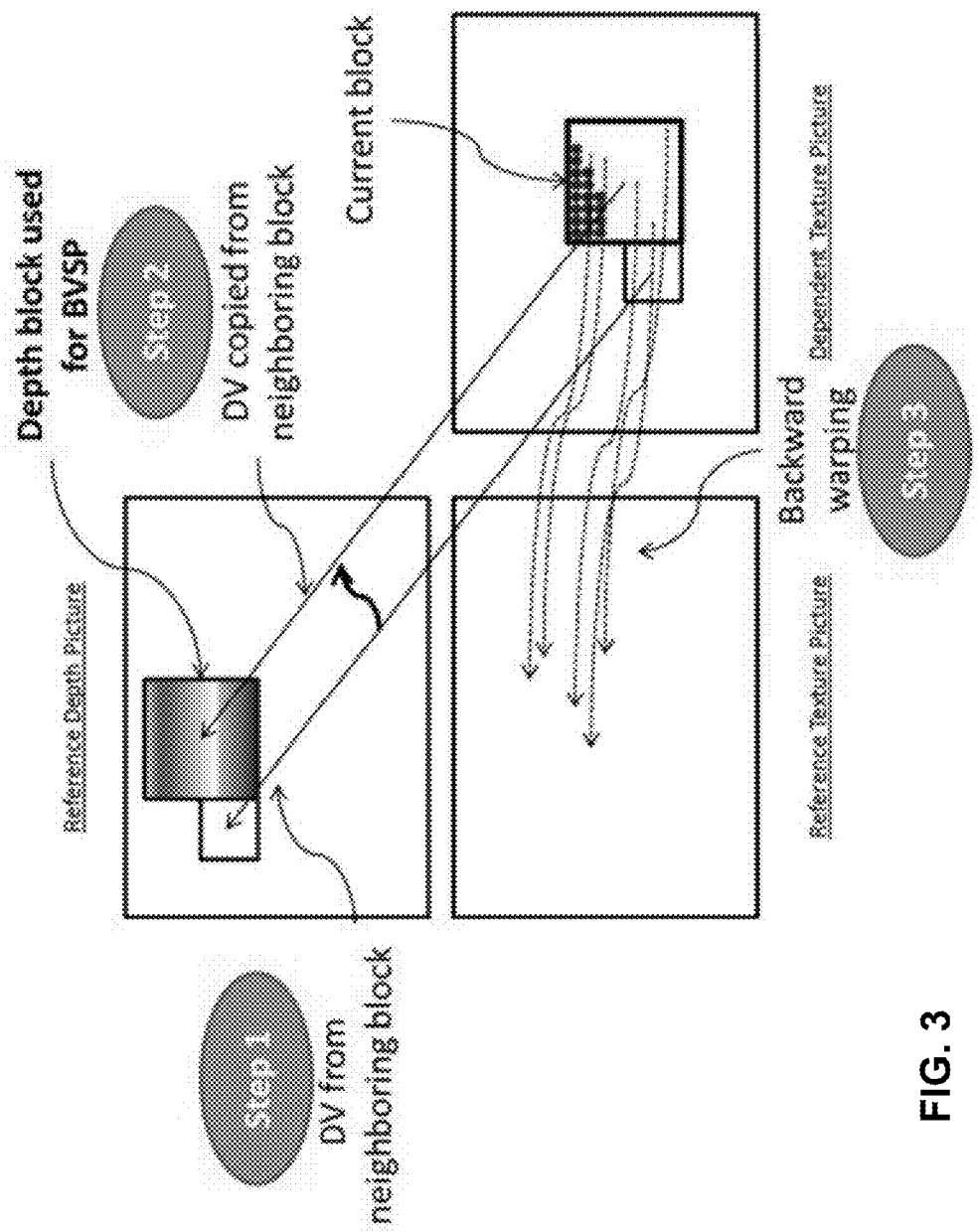
FIG. 3 is a conceptual illustration showing a depth block derivation from a reference view to do BVSP prediction.

In the HTM 5.1 test model, there exists a process to derive a disparity vector predictor, known as neighboring block disparity vector (NBDV). Let ($dv_x$, $dv_y$) denote the disparity vector identified from NBDV function, and the current block position is ($block_x$, $block_y$). It is proposed to fetch a depth block at ($block_x+dv_x$, $block_y+dv_y$) in the depth image of the reference view. The fetched depth block would have the same size of the current prediction unit (PU), and the fetched depth block will then be used to do backward warping for the current PU. FIG. 3 shows a three-step process, which demonstrates how a depth block from the reference view is located and then used for BVSP prediction. In particular, FIG. 3 shows a depth block derivation from a reference view to do BVSP prediction.

If BVSP is enabled in the sequence, the NBDV process for inter-view motion prediction is changed. For each of the temporal neighboring blocks, if the temporal neighboring block uses a disparity motion vector, the disparity motion vector is returned as the disparity vector and the disparity motion vector is further refined with the method described above with regards to the refined NBDV scheme using the information in the coded depth map. For each of the spatial neighboring blocks, and for each reference picture list 0 or reference picture list 1, the following applies. If the spatial neighboring block uses a disparity motion vector, the disparity motion vector is returned as the disparity vector and the disparity motion vector is further refined with the method described above with regards to the refined NBDV scheme using the information in the coded depth map. Otherwise, if the spatial neighboring block uses BVSP mode, the associated motion vector is returned as the disparity vector. The disparity motion vector is further refined in a similar way as described above with regards to the refined NBDV scheme using the information in the coded depth map. However, the maximum depth value is selected from all pixels of the corresponding depth block rather than four corner pixels. For each of the spatial neighboring blocks, if the spatial neighboring block uses an IDV, the IDV is returned as the disparity vector and the spatial neighboring block is further refined with the method described above with regards to the refined NBDV scheme using the information in the coded depth map.

The introduced BVSP mode is treated as a special inter-coded mode and a flag of indicating the usage of BVSP mode should be maintained for each PU. Rather than signalling the flag in the bit stream, a new merging candidate (BVSP merging candidate) is added to the merge candidate list and the flag is dependent on whether the decoded merge candidate index corresponds to a BVSP merging candidate. The BVSP merging candidate is defined as follows. The reference picture index for each reference picture list is equal to −1. Further, the motion vector for each reference picture list is the refined disparity vector.

The inserted position of BVSP merging candidate is dependent on the spatial neighbouring blocks. If any of the five spatial neighbouring blocks (A0, A1, B0, B1 or B2) is coded with the BVSP mode, i.e., the maintained flag of the neighbouring block is equal to 1, BVSP merging candidate is treated as the corresponding spatial merging candidate and inserted to the merge candidate list. Note BVSP merging candidate will only be inserted to the merge candidate list once. Otherwise (none of the five spatial neighbouring blocks are coded with the BVSP mode), the BVSP merging candidate is inserted to the merge candidate list just before the temporal merging candidates.

For each BVSP coded PU with its size denoted by NxM, the coded PU is further partitioned into several sub-regions with the size equal to KxK pixels (wherein K may be 4 or 2). For each sub-region, a separate disparity motion vector is derived and each sub-region is predicted from one block located by the derived disparity motion vector in the inter-view reference picture. In other words, the size of motion-compensation unit for BVSP coded PUs are set to KxK pixels. In common test conditions, K is set to 4.

For each sub-region (4x4-pixel block) within one PU coded with BVSP mode, a corresponding 4x4-pixel depth block is firstly located in the reference depth view with the refined disparity vector aforementioned above. The maximum value of the sixteen depth pixels in the corresponding depth block is selected. The maximum value is converted to the horizontal component of a disparity motion vector. The vertical component of the disparity motion vector is set to 0.

Based on the disparity vector derived from DoNBDV scheme, a new motion vector candidate, Inter-view Predicted Motion Vector Candidate (IPMVC), if available, may be added to AMVP and skip/merge modes. The inter-view predicted motion vector, if available, is a temporal motion vector.

Skip modes have the same motion vector derivation process as merge mode. Therefore, all techniques described in this disclosure can apply to both a merge mode and a skip mode.

For the merge/skip mode, the inter-view predicted motion vector is derived by the following process. A corresponding block of current PU/CU in a reference view of the same access unit is located by the disparity vector. If the corresponding block is not intra-coded and not inter-view predicted and its reference picture has a POC value equal to that of one entry in the same reference picture list of current PU/CU, its motion information (prediction direction, reference pictures, and motion vectors), after converting the reference index based on POC is derived to be the inter-view predicted motion vector.

The corresponding block is defined as follows. A luma location (xP, yP) of the top-left luma sample of the current prediction unit is denoted relative to the top-left luma sample of the current picture. nPSW and nPSH denote the width and height of the current prediction unit, respectively. A reference view order index is denoted as refViewIdx. A disparity vector is denoted as mvDisp. The reference layer luma location (xRef, yRef) is derived by:

$$xRef=Clip3(0,PicWidthInSamplesL-1,xP+\\((nPSW-1)\!>\!>\!1)+((mvDisp[0]+2)\!>\!>\!2)) \quad\quad (H\text{-}124)$$

$$yRef=Clip3(0,PicHeightInSamplesL-1,yP+\\((nPSH-1)\!>\!>\!1)+((mvDisp[1]+2)\!>\!>\!2)) \quad\quad (H\text{-}125)$$

The corresponding block is set to the prediction unit that covers the luma location (xRef, yRef) in the view component with ViewIdx equal to refViewIdx.

Figure 4:
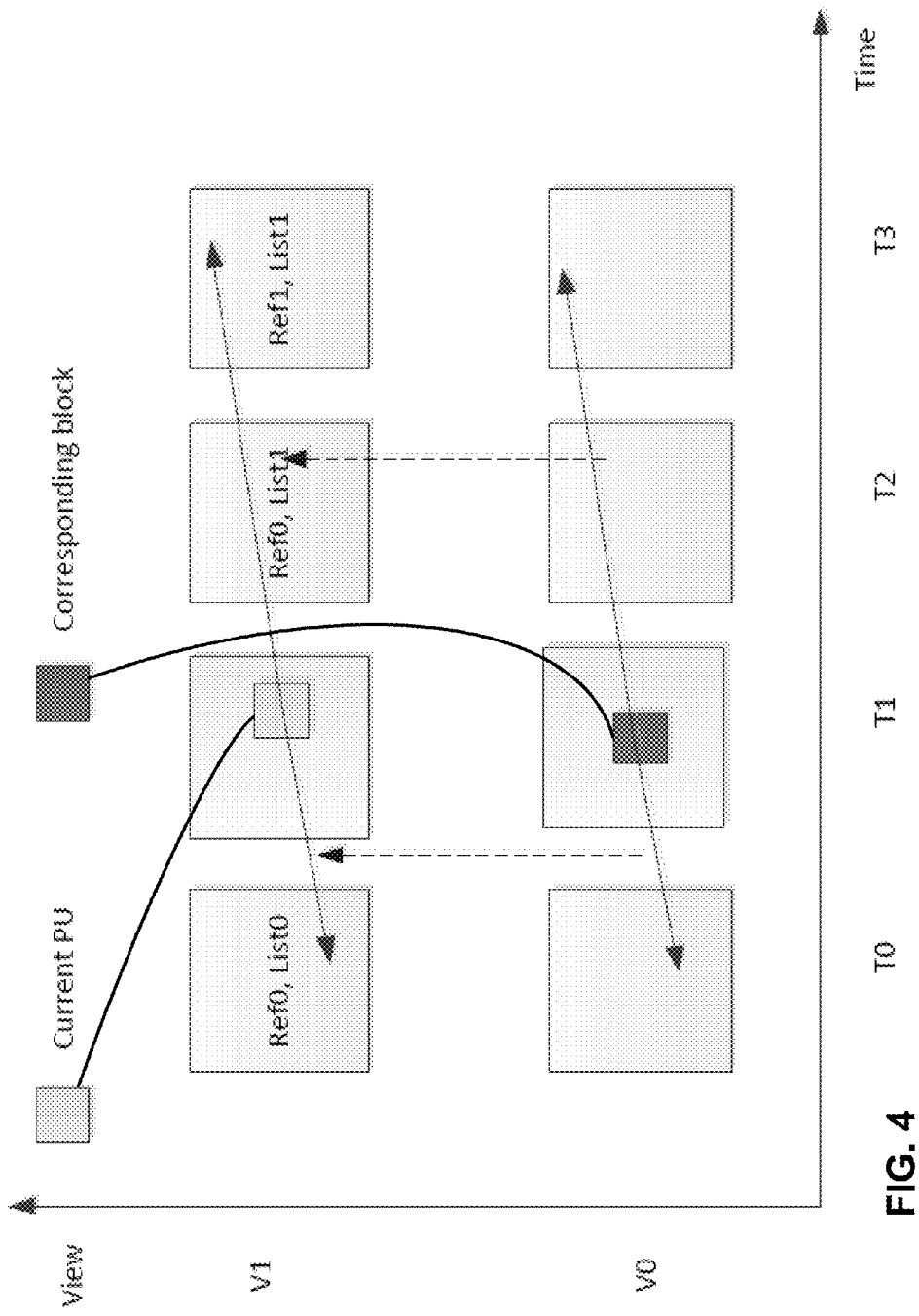
FIG. 4 is a conceptual illustration showing derivation of inter-view predicted motion vector candidate for merge/skip mode.

FIG. 4 shows an example of the derivation process of the inter-view predicted motion vector candidate. In particular, FIG. 4 shows derivation of inter-view predicted motion vector candidate for merge/skip mode.

In addition, the disparity vector is converted to an inter-view disparity motion vector, which is added into merge candidate list in a different position from IPMVC, or added into the AMVP candidate list in the same position as IPMVC when the disparity vector is available. Either IPMVC or Inter-view Disparity Motion Vector Candidate (IDMVC) is called 'inter-view candidate' in this context.

In the merge/skip mode, IPMVC, if available, is always inserted before all spatial and temporal merging candidates to the merge candidate list. IDMVC is inserted before the spatial merging candidate derived from $A_0$.

Disparity vector is firstly derived with the method of DoNBDV. With the disparity vector, the merging candidate list construction process in 3D-HEVC can be defined as follows. First, IPMVC is derived by the procedure described above. If the disparity vector is available, the disparity is inserted to the merge list. Next, the motion information of spatial neighboring PUs is checked in the following order: $A_1$, $B_1$, $B_0$, $A_0$, or $B_2$. Constrained pruning is then performed. For instance, if $A_1$ and IPMVC have the same motion vectors and the same reference indices, $A_1$ is not inserted into the candidate list. Otherwise, $A_1$ is inserted into the list. If $B_1$ and $A_1$/IPMVC have the same motion vectors and the same reference indices, $B_1$ is not inserted into the candidate list. Otherwise, $B_1$ is inserted into the list. If $B_0$ is available, $B_0$ is added to the candidate list. IDMVC is derived by the procedure described above. If $B_0$ is available and $B_0$ is different from the candidates derived from $A_1$ and $B_1$, $B_0$ is inserted to the candidate list. If BVSP is enabled for the whole picture or for the current slice, then the BVSP merging candidate is inserted to the merge candidate list. If $A_0$ is available, $A_0$ is added to the candidate list. If $B_2$ is available, $B_2$ is added to the candidate list.

Next, the video coding device may perform a derivation process for a temporal merging candidate. Similar to the temporal merging candidate derivation process in HEVC where the motion information of the co-located PU is utilized, however, the target reference picture index of the temporal merging candidate may be changed instead of fixing to be 0. When the target reference index equal to 0 corresponds to a temporal reference picture (in the same view) while the motion vector of the co-located prediction unit (PU) points to an inter-view reference picture, the target reference index is changed to another index which corresponds to the first entry of inter-view reference picture in the reference picture list. On the contrary, when the target reference index equal to 0 corresponds to an inter-view reference picture while the motion vector of the co-located prediction unit (PU) points to a temporal reference picture, the target reference index is changed to another index which corresponds to the first entry of temporal reference picture in the reference picture list.

Figure 5:
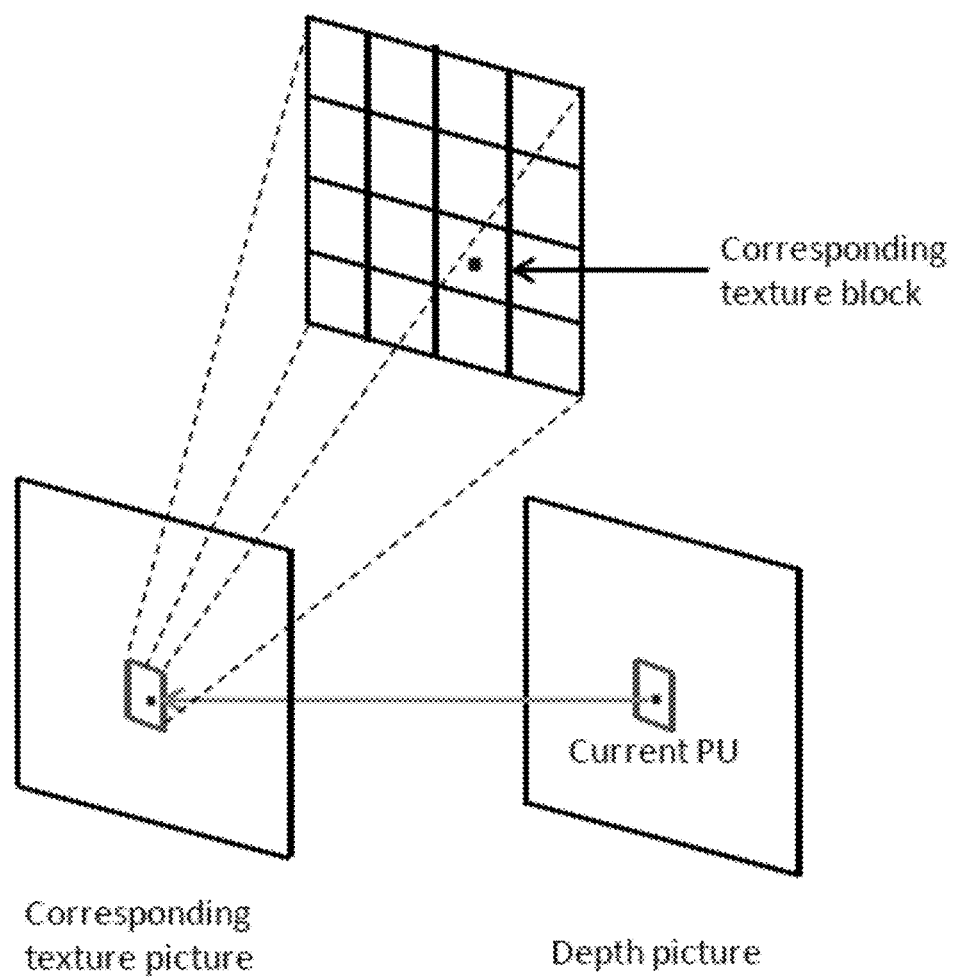
FIG. 5 is a conceptual illustration showing derivation of MVI candidate for depth coding.

If the total number of candidates derived from the above two steps are less than the maximum number of candidates, the same process as defined in HEVC is performed except the specification of l0CandIdx and l1CandIdx. The relationship among combIdx, l0CandIdx and l1CandIdx are defined in the following table (labeled TABLE 2):

images. For a given PU in the depth image, the MVI candidate reuses using the motion vectors and reference indices of the already coded corresponding texture block, if the corresponding texture block is available. FIG. 5 shows an example of the derivation process of the MVI candidate where the corresponding texture block is selected as the 4×4 block located to the right bottom of the center of the current PU. In this way, FIG. 5 illustrates derivation of MVI candidate for depth coding.

It should be noted that motion vectors with integer precision are used in depth coding while quarter precision of motion vectors is utilized for texture coding. Therefore, the motion vector of the corresponding texture block shall be scaled before using as a MVI candidate. With the MVI candidate generation, the merge candidate list for the depth views is constructed as follows. For MVI insertion, MVI is derived by the procedure described above. If the disparity vector is available, the disparity vector is inserted to the merge list.

In order to derive spatial merging candidates and for IDMVC insertion in 3D-HEVC, a video coding device checks the motion information of spatial neighboring PUs in the following order: $A_1$, $B_1$, $B_0$, $A_0$, or $B_2$. A video coding device then performs a constrained pruning procedure. If $A_1$ and MVI have the same motion vectors and the same reference indices, $A_1$ is not inserted into the candidate list. If $B_1$ and $A_1$/MVI have the same motion vectors and the same reference indices, $B_1$ is not inserted into the candidate list. If $B_0$ is available, $B_0$ is added to the candidate list. If $A_0$ is available, $A_0$ is added to the candidate list. If $B_2$ is available, $B_2$ is added to the candidate list.

In order to derive a temporal merge candidate, a video coding device performs a process similar to the temporal merging candidate derivation process in HEVC where the motion information of the co-located PU is utilized. However, the target reference picture index of the temporal merging candidate may be changed instead of fixing to be 0. When the target reference index equal to 0 corresponds to a temporal reference picture (in the same view) while the motion vector of the co-located prediction unit (PU) points to an inter-view reference picture, the target reference index is changed to another index which corresponds to the first entry of inter-view reference picture in the reference picture list. On the contrary, when the target reference index equal to 0 corresponds to an inter-view reference picture while the

TABLE 2

| Specification of l0CandIdx and l1CandIdx in 3D-HEVC | | | | | | | | | | | | | | | | | | | |
|---|---|---|---|---|---|---|---|---|---|---|---|---|---|---|---|---|---|---|---|
| combIdx | | | | | | | | | | | | | | | | | | | |
| 0 | 1 | 2 | 3 | 4 | 5 | 6 | 7 | 8 | 9 | 10 | 11 | 12 | 13 | 14 | 15 | 16 | 17 | 18 | 19 |
| l0CandIdx |
| 0 | 1 | 0 | 2 | 1 | 2 | 0 | 3 | 1 | 3 | 2 | 3 | 0 | 4 | 1 | 4 | 2 | 4 | 3 | 4 |
| l1CandIdx |
| 1 | 0 | 2 | 0 | 2 | 1 | 3 | 0 | 3 | 1 | 3 | 2 | 4 | 0 | 4 | 1 | 4 | 2 | 4 | 3 |

Finally, the same procedure as defined in HEVC for deriving a zero motion vector merging candidate is performed. In the latest software, the total number of candidates in the MRG list is up to 6 and five_minus_max_num_merge_cand is signaled to specify the maximum number of the MRG candidates subtracted from 6 in slice header. It should be noticed that five_minus_max_num_merge_cand is in the range of 0 to 5, inclusive.

The main idea behind the motion vector inheritance (MVI) is to exploit the similarity of the motion characteristics between the texture images and its associated depth motion vector of the co-located prediction unit (PU) points to a temporal reference picture, the target reference index is changed to another index which corresponds to the first entry of temporal reference picture in the reference picture list.

In order to derive combined bi-predictive merging candidates in 3D-HEVC, a video coding device performs a process dependent on the total number of derived candidates. If the total number of candidates derived from the above two steps are less than the maximum number of candidates, the same process as defined in HEVC is performed except the specification of l0CandIdx and l1CandIdx. The relationship among combIdx, l0CandIdx and l1CandIdx are defined in the Table 2 (reproduced above). In order to derive zero motion vector merging candidates, a video coding device may perform the same procedure as defined in HEVC.

Figure 6:
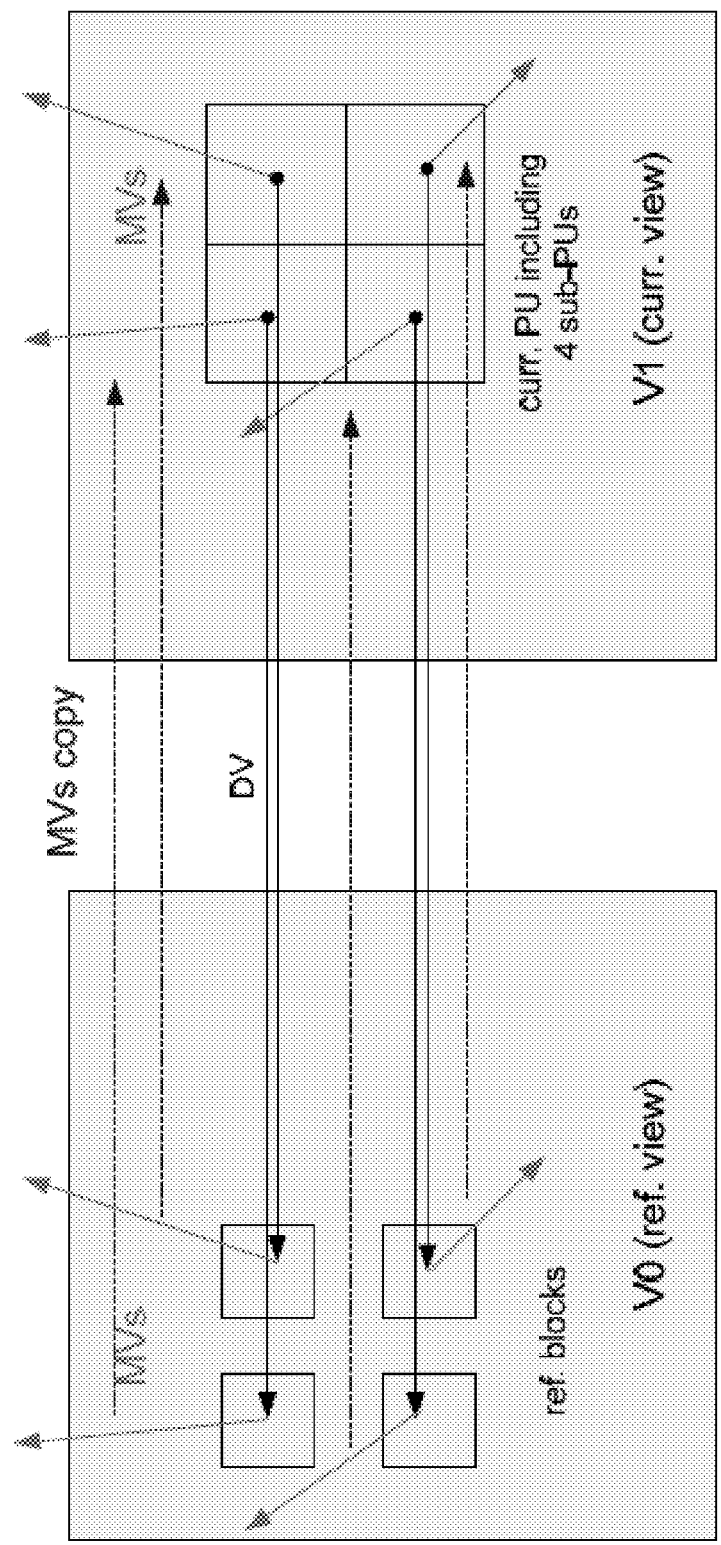
FIG. 6 is a conceptual illustration showing a sub-PU level inter-view motion prediction (SPIVMP) method.

In JCT3V-E0184, it is proposed to use a sub-PU level inter-view motion prediction method for the temporal inter-view merge candidate, i.e., the candidate derived from a reference block in the reference view. The basic concept of inter-view motion prediction is described above, wherein only the motion information of the reference block is used for the current PU in the dependent view. However, the current PU may correspond to a reference area (with the same size as current PU identified by the disparity vector) in the reference view and the reference are may have plentiful motion information. Therefore, a sub-PU level inter-view motion prediction (SPIVMP) method is proposed as shown in FIG. 6. The temporal inter-view merge candidate is derived as follows.

The assigned sub-PU has a size of N×N pixels. First, a video coding device divides the current PU into multiple sub-PUs, each with a size smaller than the current PU. The video coding device denotes the size of current PU by nPSW×nPSH and size of sub-PU by nPSWsub×nPSHSub. In this example, $nPSWsub=(\min(N,nPSW))/2$ $nPSHSub=(\min(N,nPSH))/2$ Next, the video coding device sets default motion vector tmvLX to (0, 0) and reference index refLX to −1 for each reference picture list. For each sub-PU in the raster scan order, the video coding device adds the DV to the middle position of current sub-PU to obtain a reference sample location (xRefSub, yRefSub) by:

$xRefSub=Clip3(0,PicWidthInSamplesL-1,xPSub+nPSWsub/2+((mvDisp[0]+2)>>2))$ $yRefSub=Clip3(0,PicHeightInSamplesL-1,yPSub+nPSHSub/2+((mvDisp[1]+2)>>2))$ The video coding device uses a block in the reference view that covers (xRefSub, yRefSub) as the reference block for current sub-PU.

For the identified reference block, if the identified reference block is coded using temporal motion vectors, the following apply. If both refL0 and refL1 are equal to −1 and current sub-PU is not the first one in the raster scan order, the motion information of the reference block is inherited by all the previously sub-PUs. The associated motion parameters can be used as candidate motion parameters for the current sub-PU. Further, tmvLX and refLX are updated to the motion information of the current sub-PU. Otherwise (the reference block is intra coded), the motion information of current sub-PU is set to tmvLX and refLX.

A syntax element is present in VPS indicating for each layer the sub-PU size. If the sub-PU size is larger enough, e.g., larger than the current PU, the whole PU is not using sub-PU inter-view prediction. If the sub-PU size is larger enough, e.g., larger than the largest coding unit (LCU), no PUs in the layer utilize sub-PU inter-view prediction. Different sub-PU block size may be applied, for example, 4×4, 8×8, and 16×16.

Detailed semantics of such a syntax element is as follows. log 2_sub_pb_size_minus2[layerId] specifies the value of the variable SubPbSize[layerId] that is used in the decoding of prediction units using the inter-view merge candidate. The value of log 2_sub_pb_size_minus2 may be in the range of 0 to 4, inclusive. This syntax element is coded with ue(v). Accordingly, the bit depth of this syntax element may be variable.

In HEVC, after a picture is coded and before the picture is put into the decoded picture buffer (DPB), motion vectors can be compressed to be stored in a 16×16 block level. In 3D-HEVC, however, since motion prediction is enabled crossing layers, the motion compression is done in a two-step fashion. Firstly, after a picture of one view is decoded and before the picture is put into the DPB, the picture is compressed to 8×8 block level. When the whole access unit is decoded, meaning each picture of each layer of the access unit is decoded, the motion compression to 16×16 block level is done. In HEVC, for each 8×8 block, at most two motion vectors are maintained. The at most two motion vectors may either be two motion vectors corresponding to RefPicList0 and RefPicList1 respectively, or two motion vectors belonging to two PUs (two 4×8, two 8×4), both corresponding to RefPicList0.

As proposed in JCT3V-F0128, an index value can be signaled to indicate that a motion parameter inheritance (MPI) merge candidate based on sub-PU level motion prediction (i.e., sub-PU MPI mode) can be utilized for motion prediction. With the proposed sub-PU level MPI mode merge candidate, for each 8×8-pixel block within a current depth PU, the motion parameters of the co-located texture block which covers the middle position of the current 8×8-pixel block are inherited. With the proposed sub-PU MPI mode, different motion vectors can be inherited for 8×8-pixel sub-PUs within one depth PU.

The current 3D-HEVC standard has the following problems especially when considering the sub-PU MPI mode. If the sub-PU size for inter-view motion prediction is equal to 4×4 pixels, the motion compensation processes of 4×4-pixel blocks are required, which is not aligned with the HEVC base design. Further, when the sub-PU MPI mode applies, there is no way to control the motion vector accuracy and 8×8-pixel sub-PU MPI mode is always used. In other words, when the sub-PU MPI mode applies, 4×4-pixel and 16×16-pixel sub-PUs cannot be processed, forcing coding devices to use 8×8-pixel sub-PUs, which may not be optimal.

Techniques related to sub-PU inter-view motion prediction, sub-PU MPI mode and motion compression are described herein. Namely, a syntax element is described that indicates the sub-PU MPI size. In some examples, the syntax element may be named log 2_sub_pb_mpi_size_minus3. The range of values of this syntax element is from 0 to 3 inclusive. By including this syntax element in the video coding scheme, a video coding device may use processes specific to motion compensation of 4×4-pixel blocks, even when the video coding device implements HEVC base design. Further, by including this syntax element, sub-PU MPI may be used with sizes other than 8×8-pixel. For example, 4×4-pixel and 16×16-pixel sub-PU MPI may be used, increasing the accuracy and precision with which sub-PU MPI may be utilized in various coding techniques. This added flexibility will further increase coding efficiency when an index value indicates that sub-PU MPI is applicable, increasing processing speed during video coding.

Such a syntax element (e.g., a syntax element indicative of sub-PU MPI size, such as log 2_sub_pb_mpi_size_minus3) is associated with all depth views (i.e., each layer of depth blocks), thus present once in the Video Parameter Set (VPS), Picture Parameter Set (PPS), or Sequence parameter Set (SPS). When the syntax element is present in the PPS and the SPS (i.e., two active instances of the syntax elementlog 2_sub_pb_mpi_size_minus3), the values of these two syntax elements may be the same. Alternatively, such a syntax element may be present for each depth view once in the VPS, the SPS or the PPS.

The size of the sub-PUs used for sub-PU MPI start from 8×8. When a current depth PU has a size that is larger or equal to (1<<(log 2_sub_pb_mpi_size_minus3+3))×(1<<(log 2_sub_pb_mpi_size_minus3+3)), sub-PU MPI doesn't apply to the current PU and the original MPI applies.

When log 2_sub_pb_mpi_size_minus3 is equal to 1 or larger, motion compression to 16×16 in this case can be done once all pictures of the texture views within the same access unit are decoded. In this case, when texture views are coded independent to depth views, all pictures of texture views in any access unit can be decoded earlier before any pictures of the depth views are coded and motion compression can be done for texture pictures after they are decoded.

When log 2_sub_pb_mpi_size_minus3 is equal to 0, meaning the sub-PU MPI size is 8×8, and when the co-located texture block contains two PUs (4×8 or 8×4), the current sub-PU may be further partitioned into two smaller blocks, with size of 4×8 or 8×4, motion compensation (uni-directional) on these two smaller blocks apply in the sub-PU MPI mode. Two motion vectors corresponding to RefPicList0 are inherited for the current sub-PU in the depth PU. Instead of only enabling 8×8 or larger sizes motion compensation when sub-PU MPI apply, as in JCT3V-F0128, such a sub-PU can be motion compensated with block size equal to 4×8 or 8×4. Alternatively, enabling of such a partition can be signaled by a syntax element (e.g., a flag) in VPS, SPS or PPS.

In some examples, a video coding device may align the 3D-HEVC design with HEVC in terms of the smallest motion compensation size. Therefore, sub-PU size equal to 4×4 may be disabled in these examples. In such a case, log 2_sub_pb_size_minus2 may be changed to log 2_sub_pb_size_minus3 and the range of log 2_sub_pb_size_minus3 is 0 to 3, inclusive.

Figure 7:
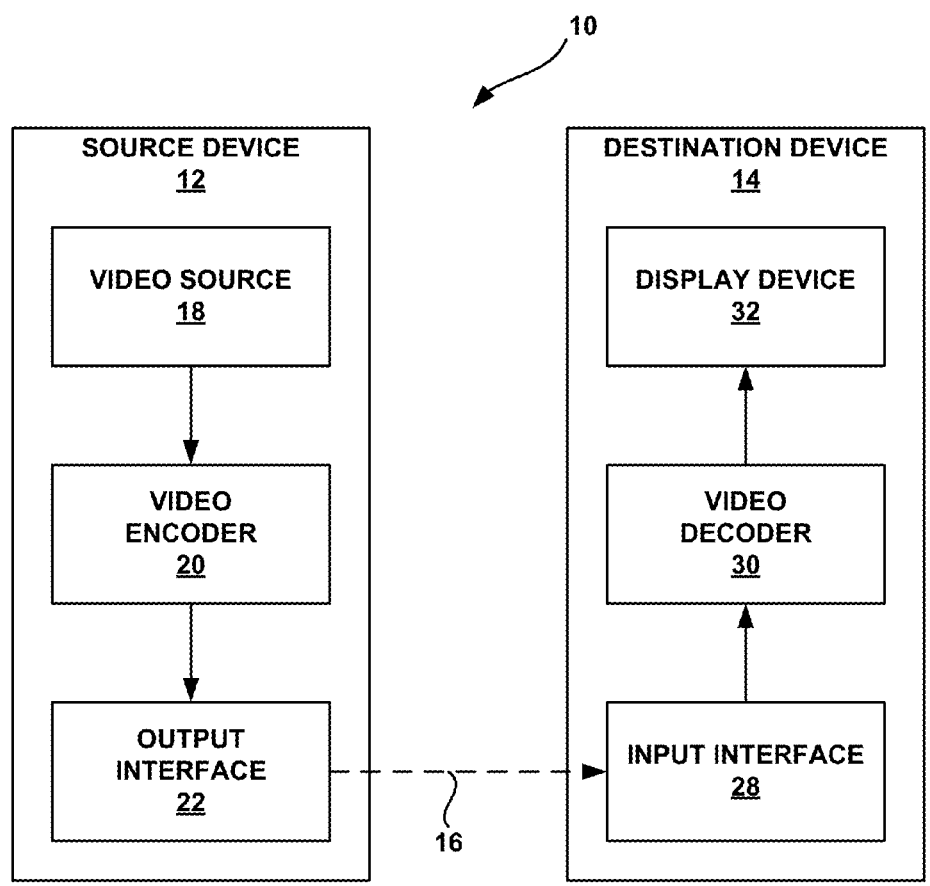
FIG. 7 is a block diagram illustrating an example system that may implement techniques of this disclosure.

FIG. 7 is a block diagram illustrating an example video coding system 10 that may utilize the techniques of this disclosure. As described herein, the term "video coder" refers generically to both video encoders and video decoders. In this disclosure, the terms "video coding" or "coding" may refer generically to video encoding or video decoding.

As shown in FIG. 7, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). Channel 16 may include various types of devices, such as routers, switches, base stations, or other equipment that facilitate communication from source device 12 to destination device 14.

In another example, channel 16 may include a storage medium that stores encoded video data generated by source device 12. In this example, destination device 14 may access the storage medium via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

In the example of FIG. 7, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

Video encoder 20 may further execute techniques in accordance with this disclosure. For example, video encoder 20 may determine a size of a sub-prediction unit (sub-PU) for motion parameter inheritance (MPI) in a depth prediction unit (depth PU). The depth PU may be one or more sub-PUs. Each sub-PU may have equal size. Further, distinct motion information can be inherited for each sub-PU from a texture block co-located to the respective sub-PU. Video encoder 20 may encode each sub-PU of the depth block based at least in part based at least in part on MPI corresponding to texture blocks co-located with each of the sub-PUs. Video encoder 20 may further generate a syntax element that indicates the size of each sub-PU for MPI in the depth PU.

In the example of FIG. 7, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) and Multiview Video Coding (MVC) extensions. In other examples, video encoder 20 and video decoder 30 may operate according to other video compression standards, including the High Efficiency Video Coding (HEVC) standard presently under development. A draft of the HEVC standard currently being developed, referred to as "HEVC Working Draft 9," is described in Bross et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting: Shanghai, China, October, 2012. The techniques of this disclosure, however, are not limited to any particular coding standard or technique. Another recent draft of the HEVC standard, referred to as "HEVC Working Draft 10" or "WD10," is described in document JCTVC-L1003v34, Bross et al., "High efficiency video coding (HEVC) text specification draft 10 (for FDIS & Last Call)," Joint Collaborative Team on Video Coding (JCT-VC) of ITU-T SG16 WP3 and ISO/IEC JTC1/SC29/WG11, 12th Meeting: Geneva, CH, 14-23 Jan., 2013. Yet another draft of the HEVC standard, is referred to herein as "WD10 revisions" described in Bross et al., "Editors' proposed corrections to HEVC version 1," Joint Collaborative Team on Video Coding (JCT-VC) of ITU-T SG16 WP3 and ISO/IEC JTC1/SC29/WG11, 13th Meeting, Incheon, KR, April 2013.

Video decoder 30 may also be configured to execute techniques in accordance with this disclosure. For example, video decoder 30 may receive a syntax element that indicates a size of a sub-prediction unit (sub-PU) for motion parameter inheritance (MPI) in a depth prediction unit (depth PU). The depth PU may be one or more sub-PUs. Each sub-PU may have a size equal to the size indicated by the syntax element. Further, distinct motion information can be inherited for each sub-PU from a texture block co-located to the respective sub-PU. Upon receiving an index value that indicates a sub-PU MPI mode, video decoder 30 may further inherit MPI for each of the sub-PUs of the depth block based at least in part on corresponding texture blocks co-located with each of the sub-PUs.

FIG. 7 is merely an example and the techniques of this disclosure may apply to video coding settings (e.g., video encoding or video decoding) that do not necessarily include any data communication between the video encoding device and the video decoding device. In other examples, data is retrieved from a local memory, streamed over a network, or the like. A video encoding device may encode and store data to memory, and/or a video decoding device may retrieve and decode data from memory. In many examples, the video encoding and decoding is performed by devices that do not communicate with one another, but simply encode data to memory and/or retrieve and decode data from memory.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which a video decoding device may then retrieve at any time after being stored to this medium. In some examples, from an encoder perspective, signaling may include generating an encoded bitstream, and from a decoder perspective, signaling may include receiving and parsing a coded bitstream.

As mentioned briefly above, video encoder 20 encodes video data. The video data may comprise one or more pictures. Each of the pictures is a still image forming part of a video. When video encoder 20 encodes the video data, video encoder 20 may generate a bitstream. The bitstream may include a sequence of bits that form a coded representation of the video data. The bitstream may include coded pictures and associated data. A coded picture is a coded representation of a picture. The associated data may include sequence parameter sets (SPSs), picture parameter sets (PPSs), video parameter sets (VPSs), adaptive parameter sets (APSs), slice headers, block headers, and other syntax structures.

A picture may include three sample arrays, denoted $S_L$, $S_{Cb}$ and $S_{Cr}$. $S_L$ is a two-dimensional array (i.e., a block) of luma samples. Luma samples may also be referred to herein as "Y" samples. $S_{Cb}$ is a two-dimensional array of Cb chrominance samples. $S_{Cr}$ is a two-dimensional array of Cr chrominance samples. Chrominance samples may also be referred to herein as "chroma" samples. Cb chrominance samples may be referred to herein as "U samples." Cr chrominance samples may be referred to herein as "V samples."

In some examples, video encoder 20 may down-sample the chroma arrays of a picture (i.e., $S_{Cb}$ and $S_{Cr}$). For example, video encoder 20 may use a YUV 4:2:0 video format, a YUV 4:2:2 video format, or a 4:4:4 video format. In the YUV 4:2:0 video format, video encoder 20 may down-sample the chroma arrays such that the chroma arrays are ½ the height and ½ the width of the luma array. In the YUV 4:2:2 video format, video encoder 20 may down-sample the chroma arrays such that the chroma arrays are ½ the width and the same height as the luma array. In the YUV 4:4:4 video format, video encoder 20 does not down-sample the chroma arrays.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs).

As part of encoding a picture, video encoder 20 may generate encoded representations of each slice of the picture (i.e., coded slices). To generate a coded slice, video encoder 20 may encode a series of CTUs. This disclosure may refer to an encoded representation of a CTU as a coded CTU. In some examples, each of the slices includes an integer number of coded CTUs.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. Video encoder 20 may partition a coding block of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Video encoder 20 may use uni-prediction or bi-prediction to generate the predictive blocks of a PU. When video encoder 20 uses uni-prediction to generate the predictive blocks for a PU, the PU may have a single MV. When video encoder 20 uses uni-prediction to generate the predictive blocks for a PU, the PU may have two MVs.

After video encoder 20 generates predictive luma, Cb and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb and Cr residual blocks of a CU into one or more luma, Cb and Cr transform blocks. A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. For 3D coding, depth values in depth blocks may likewise be represented as sample values, each indicating a level of depth associated with a given pixel location. The techniques of this disclosure are applicable to the coding of depth blocks, particularly in modes such as skip mode or merge mode where a list of candidates is generated for inheriting or using motion information of a selected candidate, in coding the depth block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encoding syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video decoder 30 may receive a bitstream generated by video encoder 20. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use MVs of PUs to determine predictive sample blocks for the PUs of a current CU. In addition, video decoder 30 may inverse quantize transform coefficient blocks associated with TUs of the current CU. Video decoder 30 may perform inverse transforms on the transform coefficient blocks to reconstruct transform blocks associated with the TUs of the current CU. Video decoder 30 may reconstruct the coding blocks of the current CU by adding the samples of the predictive sample blocks for PUs of the current CU to corresponding samples of the transform blocks of the TUs of the current CU. By reconstructing the coding blocks for each CU of a picture, video decoder 30 may reconstruct the picture.

In some cases, video encoder 20 may signal the motion information of a PU using merge mode or a skip mode, or possibly an advanced MV prediction (AMVP) mode. The motion information of a PU may include motion vector(s) of the PU and reference index(s) of the PU. When video encoder 20 signals the motion information of a current PU using merge mode, video encoder 20 generates a merge candidate list. The merge candidate list includes a set of candidates. The candidates may indicate the motion information of PUs that spatially or temporally neighbor the current PU. Video encoder 20 may then select a candidate from the candidate list and may use the motion information indicated by the selected candidate as the motion information of the current PU. Furthermore, in merge mode, video encoder 20 may signal the position in the candidate list of the selected candidate. Video decoder 30 may generate the same candidate list and may determine, based on the indication of the position of the selected candidate, the selected candidate. Video decoder 30 may then use the motion information of the selected candidate to generate predictive samples for the current PU, and may generate a residual signal as the difference between the current PU and predictive samples of the predictive PU identified in the merge mode.

Skip mode is similar to merge mode in that video encoder 20 generates a candidate list and selects a candidate from the list of candidates. However, when video encoder 20 signals the motion information of a current PU (e.g. a depth block) using skip mode, video encoder 20 may avoid generation of any residual signal.

AMVP mode is similar to merge mode in that video encoder 20 generates a candidate list and selects a candidate from the list of candidates. However, when video encoder 20 signals the motion information of a current PU (e.g. a depth block) using AMVP mode, video encoder 20 may signal a motion vector difference (MVD) for the current PU and a reference index in addition to signaling a position of the selected candidate in the candidate list. An MVD for the current PU may indicate a difference between an MV of the current PU and an MV of the selected MV candidate. In uni-prediction, video encoder 20 may signal one MVD and one reference indexes for the current PU. In bi-prediction, video encoder 20 may signal two MVDs and two reference indexes for the current PU. For depth block prediction consistent with this disclosure, video encoder 20 would typically signal one MVD and one reference indexes for the current PU, although depth block prediction could also use techniques similar to bi-prediction where two MVDs and two reference indexes are signaled.

Furthermore, when the motion information of a current PU is signaled using AMVP mode, video decoder 30 may generate the same candidate list and may determine, based on the indication of the position of the selected candidate, the selected candidate. Video decoder 30 may recover an MV of the current PU by adding a MVD to the MV of the selected candidate. Video decoder 30 may then use the recovered MV or MVs of the current PU to generate predictive sample blocks for the current PU.

In accordance with this disclosure, video encoder 20 and video decoder 30 may perform one or more techniques described herein as part of a video coding process (e.g., video encoding or video decoding). For example, video encoder 20 may determine a size of a sub-prediction unit (sub-PU) for motion parameter inheritance (MPI) in a depth prediction unit (depth PU). The depth PU may be one or more sub-PUs. Each sub-PU may have equal size. Further, distinct motion information can be inherited for each sub-PU from a texture block co-located to the respective sub-PU. Video encoder 20 may encode each sub-PU of the depth block based at least in part based at least in part on MPI corresponding to texture blocks co-located with each of the sub-PUs. Video encoder 20 may further generate and transmit a syntax element (e.g., the syntax element, log 2_sub_pb_mpi_size_minus3, discussed above) that indicates the size of each sub-PU for MPI in the depth PU.

Further, video decoder 30 may receive the syntax element (e.g., the syntax element generated and transmitted by video encoder 20) that indicates a size of a sub-prediction unit (sub-PU) for motion parameter inheritance (MPI) in a depth prediction unit (depth PU). The depth PU may be one or more sub-PUs. Each sub-PU may have a size equal to the size indicated by the syntax element. Further, distinct motion information can be inherited for each sub-PU from a texture block co-located to the respective sub-PU. Upon receiving an index value that indicates a sub-PU MPI mode, video decoder 30 may further inherit MPI for each of the sub-PUs of the depth block based at least in part on corresponding texture blocks co-located with each of the sub-PUs.

Figure 8:
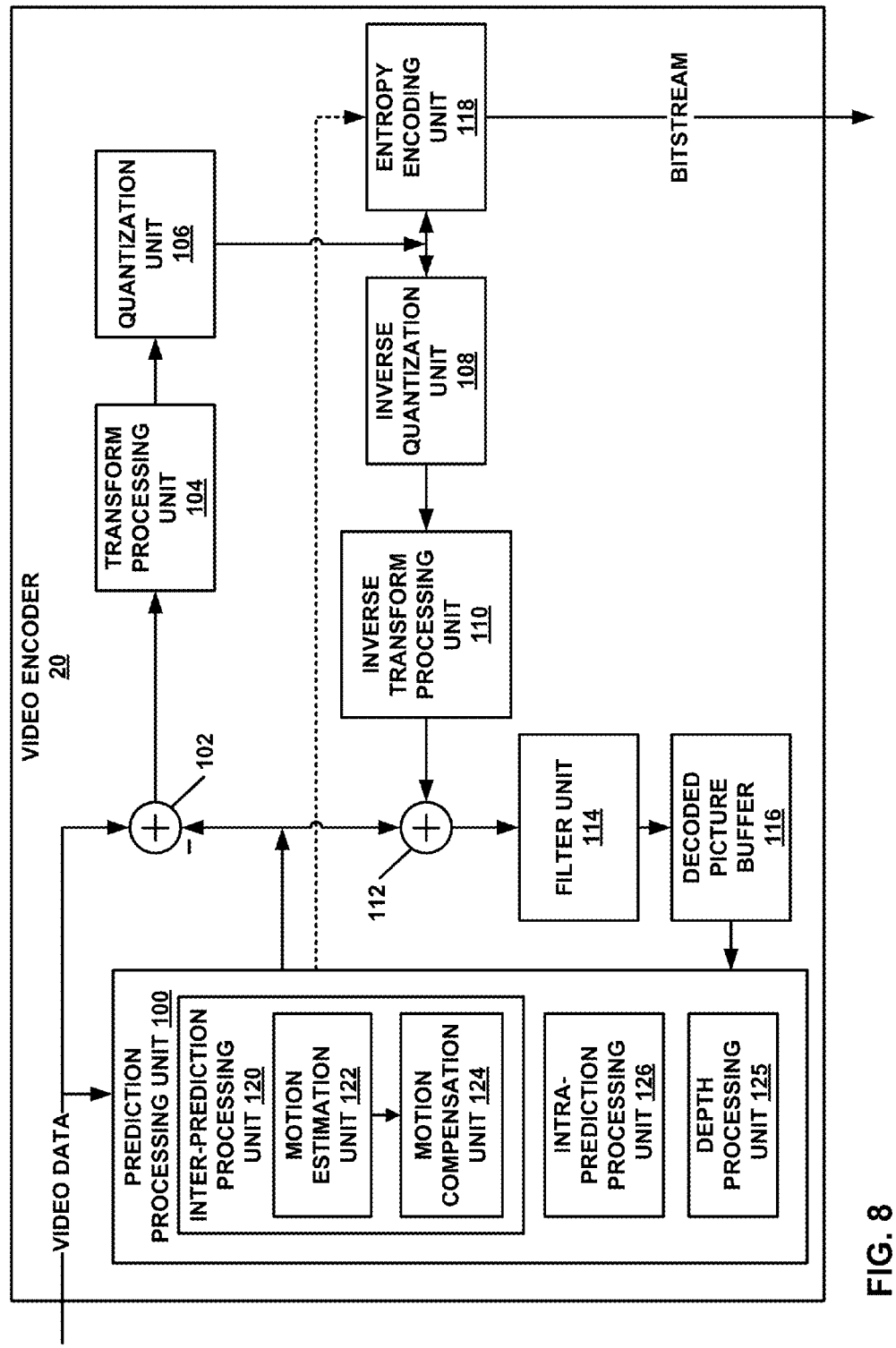
FIG. 8 is a block diagram illustrating an example video encoder that may implement the techniques of this disclosure.

FIG. 8 is a block diagram illustrating an example video encoder 20 that may implement the techniques of this disclosure. FIG. 8 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 8, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit 122 and a motion compensation unit 124. In other examples, video encoder 20 may include more, fewer, or different functional components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller block may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter-prediction on each PU of a CU. The predictive data for the PU may include a predictive sample blocks of the PU and motion information for the PU. Inter-prediction unit 121 may perform different operations for a PU of a CU depending on whether the PU is in an I slice, a P slice, or a B slice. In an I slice, all PUs are intra predicted. Hence, if the PU is in an I slice, inter-prediction unit 121 does not perform inter prediction on the PU. Thus, for blocks encoded in I-mode, the predicted block is formed using spatial prediction from previously-encoded neighboring blocks within the same frame.

If a PU is in a P slice, motion estimation unit 122 may search the reference pictures in a list of reference pictures (e.g., "RefPicList0") for a reference region for the PU. The reference region for the PU may be a region, within a reference picture, that contains sample blocks that most closely corresponds to the sample blocks of the PU. Motion estimation unit 122 may generate a reference index that indicates a position in RefPicList0 of the reference picture containing the reference region for the PU. In addition, motion estimation unit 122 may generate an MV that indicates a spatial displacement between a coding block of the PU and a reference location associated with the reference region. For instance, the MV may be a two-dimensional vector that provides an offset from the coordinates in the current decoded picture to coordinates in a reference picture. Motion estimation unit 122 may output the reference index and the MV as the motion information of the PU. Motion compensation unit 124 may generate the predictive sample blocks of the PU based on actual or interpolated samples at the reference location indicated by the motion vector of the PU.

If a PU is in a B slice, motion estimation unit 122 may perform uni-prediction or bi-prediction for the PU. To perform uni-prediction for the PU, motion estimation unit 122 may search the reference pictures of RefPicList0 or a second reference picture list ("RefPicList1") for a reference region for the PU. Motion estimation unit 122 may output, as the motion information of the PU, a reference index that indicates a position in RefPicList0 or RefPicList1 of the reference picture that contains the reference region, an MV that indicates a spatial displacement between a sample block of the PU and a reference location associated with the reference region, and one or more prediction direction indicators that indicate whether the reference picture is in RefPicList0 or RefPicList1. Motion compensation unit 124 may generate the predictive sample blocks of the PU based at least in part on actual or interpolated samples at the reference region indicated by the motion vector of the PU.

To perform bi-directional inter prediction for a PU, motion estimation unit 122 may search the reference pictures in RefPicList0 for a reference region for the PU and may also search the reference pictures in RefPicList1 for another reference region for the PU. Motion estimation unit 122 may generate reference picture indexes that indicate positions in RefPicList0 and RefPicList1 of the reference pictures that contain the reference regions. In addition, motion estimation unit 122 may generate MVs that indicate spatial displacements between the reference location associated with the reference regions and a sample block of the PU. The motion information of the PU may include the reference indexes and the MVs of the PU. Motion compensation unit 124 may generate the predictive sample blocks of the PU based at least in part on actual or interpolated samples at the reference region indicated by the motion vector of the PU.

In accordance with one or more techniques of this disclosure, one or more units within video encoder 20 may perform one or more techniques described herein as part of a video encoding process. Additional 3D components may also be included within video encoder 20, such as for example, depth processing unit 125. Depth processing unit 125 may perform one or more techniques of this disclosure, in some examples.

For example, depth processing unit 125 video encoder 20 may determine a size of a sub-prediction unit (sub-PU) for motion parameter inheritance (MPI) in a depth prediction unit (depth PU). The depth PU may be one or more sub-PUs. Each sub-PU may have equal size. Further, distinct motion information can be inherited for each sub-PU from a texture block co-located to the respective sub-PU. Depth processing unit 125 of video encoder 20 may encode each sub-PU of the depth block based at least in part based at least in part on MPI corresponding to texture blocks co-located with each of the sub-PUs. Depth processing unit 125 of video encoder 20 may further generate a syntax element that indicates the size of each sub-PU for MPI in the depth PU.

In different examples, prediction processing unit 100, inter-prediction processing unit 120, motion estimation unit 122, motion compensation unit 124, intra-prediction processing unit 126, depth processing unit 125 and/or another unit of video encoder may perform a method of encoding data associated with 3D video consistent with the techniques described herein. One of these units (or any combination thereof), for example, may be configured to perform MPI techniques as described herein as part of a video encoding process.

Continued reference is now made to the example of FIG. 8. Intra-prediction processing unit 126 may generate predictive data for a PU by performing intra prediction on the PU. The predictive data for the PU may include predictive sample blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. To use an intra prediction mode to generate a set of predictive data for the PU, intra-prediction processing unit 126 may extend samples from sample blocks of neighboring PUs across the sample blocks of the PU in a direction associated with the intra prediction mode. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive sample blocks of the selected predictive data may be referred to herein as the selected predictive sample blocks.

Residual generation unit 102 may generate, based on the luma, Cb and Cr coding block of a CU and the selected predictive luma, Cb and Cr blocks of the PUs of the CU, a luma, Cb and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive sample block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive sample blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

Figure 9:
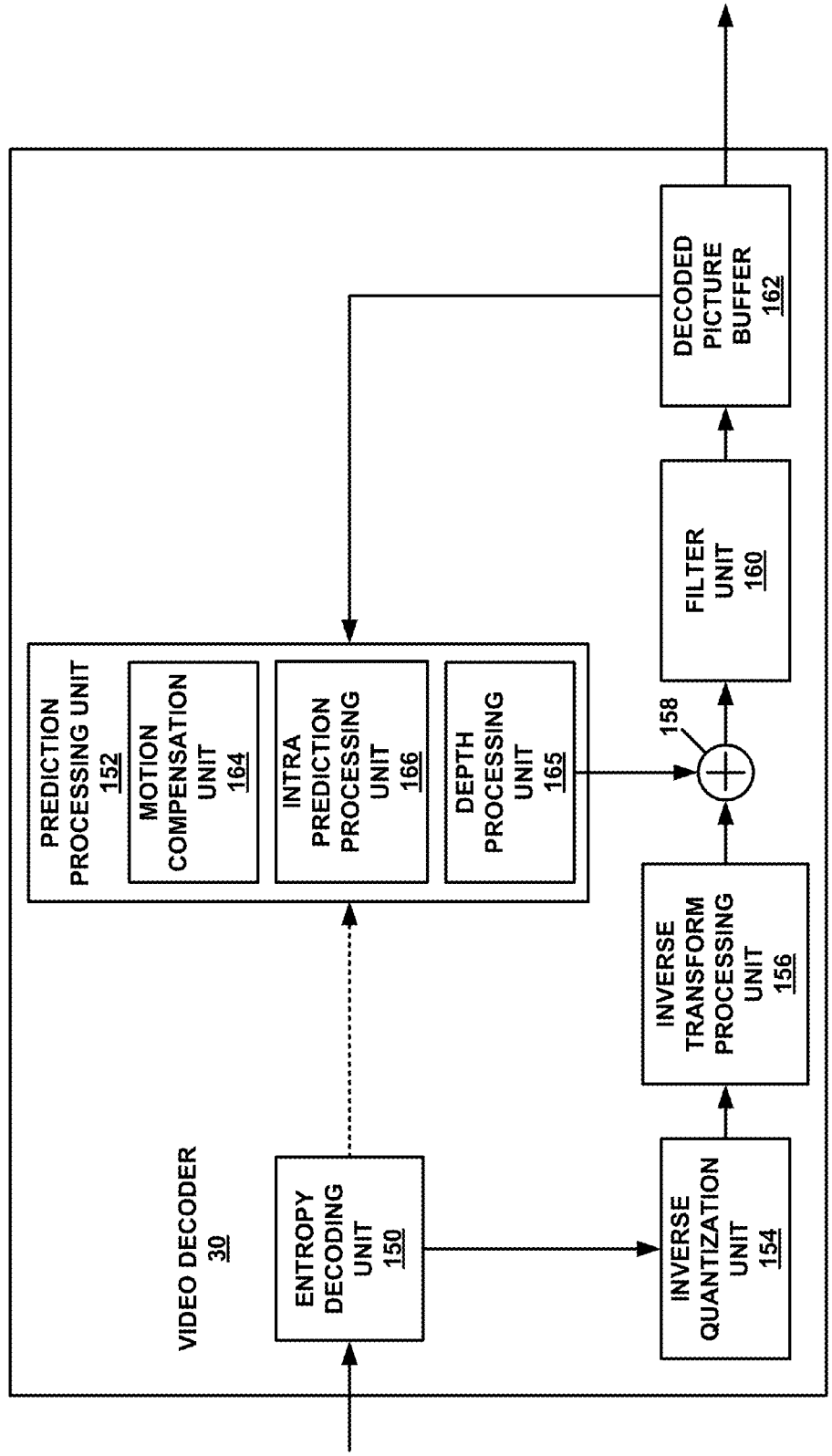
FIG. 9 is a block diagram illustrating an example video decoder that may implement the techniques of this disclosure.

FIG. 9 is a block diagram illustrating an example video decoder 30 that is configured to implement the techniques of this disclosure. FIG. 9 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 9, video decoder 30 includes an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

Video decoder 30 may receive a bitstream. Entropy decoding unit 150 may parse the bitstream to decode syntax elements from the bitstream. Entropy decoding unit 150 may entropy decode entropy-encoded syntax elements in the bitstream. Prediction processing unit 152, inverse quantization unit 154, inverse transform processing unit 156, reconstruction unit 158, and filter unit 160 may generate decoded video data based on the syntax elements extracted from the bitstream.

The bitstream may comprise a series of NAL units. The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition to decoding syntax elements from the bitstream, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples blocks at the one or more reference blocks for the PU, predictive luma, Cb and Cr blocks for the PU.

As indicated above, video encoder 20 may signal the motion information of a PU using merge mode, skip mode or AMVP mode. When video encoder 20 signals the motion information of a current PU using AMVP mode, entropy decoding unit 150 may decode, from the bitstream, a reference index, a MVD for the current PU, and a candidate index. Furthermore, motion compensation unit 164 may generate an AMVP candidate list for the current PU. The AMVP candidate list includes one or more MV predictor candidates. Each of the MV predictor candidates specifies a MV of a PU that spatially or temporally neighbors the current PU. Motion compensation unit 164 may determine, based at least in part on the candidate index, a selected MV predictor candidate in the AMVP candidate list. Motion compensation unit 164 may then determine the MV of the current PU by adding the MVD to the MV specified by the selected MV predictor candidate. In other words, for AMVP, MV is calculated as MV=MVP+MVD, wherein the index of the motion vector predictor (MVP) is signaled and the MVP is one of the MV candidates (spatial or temporal) from the AMVP list, and the MVD is signaled to the decoder side.

If the current PU is bi-predicted, entropy decoding unit 150 may decode an additional reference index, MVD, and candidate index from the bitstream. Motion compensation unit 162 may repeat the process described above using the additional reference index, MD, and candidate index to derive a second MV for the current PU. In this way, motion compensation unit 162 may derive a MV for RefPicList0 (i.e., a RefPicList0 MV) and a MV for RefPicList1 (i.e., a RefPicList1 MV).

In accordance with one or more techniques of this disclosure, one or more units within video decoder 30 may perform one or more techniques described herein as part of a video decoding process. Additional 3D components may also be included within video decoder 30, such as for example, depth processing unit 165. Depth processing unit 165 may perform the techniques in some examples.

For example, depth processing unit 165 of video decoder 30 may receive a syntax element that indicates a size of a sub-prediction unit (sub-PU) for motion parameter inheritance (MPI) in a depth prediction unit (depth PU). The depth PU may be one or more sub-PUs. Each sub-PU may have a size equal to the size indicated by the syntax element. Further, distinct motion information can be inherited for each sub-PU from a texture block co-located to the respective sub-PU. Upon receiving an index value that indicates a sub-PU MPI mode, depth processing unit 165 of video decoder 30 may further inherit MPI for each of the sub-PUs of the depth block based at least in part on corresponding texture blocks co-located with each of the sub-PUs.

In some examples, prediction processing unit 152, motion compensation unit 164, intra prediction processing unit 166, depth processing unit 165 and/or another unit of video decoder 30 may perform a method of decoding data associated with 3D video consistent with the techniques described herein. One of these units (or any combination thereof), for example, may be configured to perform MPI techniques as described herein as part of a video decoding process.

Continuing reference is now made to FIG. 9. Reconstruction unit 158 may use the luma, Cb and Cr transform blocks associated with TUs of a CU and the predictive luma, Cb and Cr blocks of the PUs of the CU, i.e., either intra-prediction data or inter-prediction data, as applicable, to reconstruct the luma, Cb and Cr coding blocks of the CU. For example, reconstruction unit 158 may add samples of the luma, Cb and Cr transform blocks to corresponding samples of the predictive luma, Cb and Cr blocks to reconstruct the luma, Cb and Cr coding blocks of the CU.

Filter unit 160 may perform a deblocking operation to reduce blocking artifacts associated with the luma, Cb and Cr coding blocks of the CU. Video decoder 30 may store the luma, Cb and Cr coding blocks of the CU in decoded picture buffer 162. Decoded picture buffer 162 may provide reference pictures for subsequent motion compensation, intra prediction, and presentation on a display device, such as display device 32 of FIG. 7. For instance, video decoder 30 may perform, based on the luma, Cb, and Cr blocks in decoded picture buffer 162, intra-prediction or inter-prediction operations on PUs of other CUs. In this way, video decoder 30 may extract, from the bitstream, transform coefficient levels of the significant luma coefficient block, inverse quantize the transform coefficient levels, apply a transform to the transform coefficient levels to generate a transform block, generate, based at least in part on the transform block, a coding block, and output the coding block for display.

Figure 10:
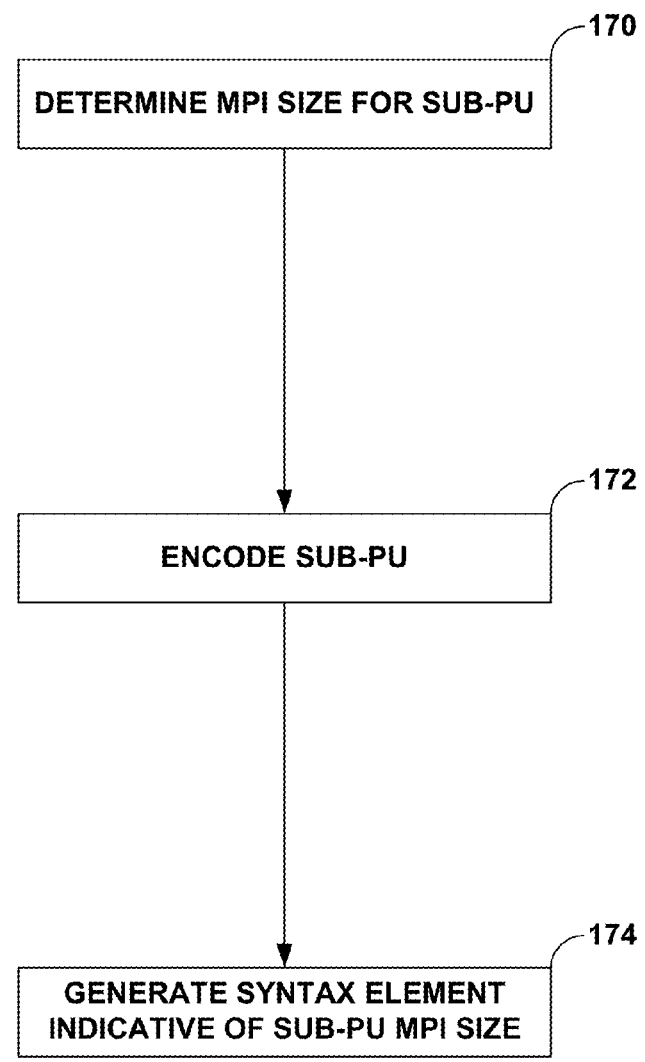
FIG. 10 is a flow diagram illustrating an example encoding technique in accordance with this disclosure.

FIG. 10 is a flow diagram illustrating an example encoding technique in accordance with this disclosure. For example, depth processing unit 125 video encoder 20 may determine a size of a sub-prediction unit (sub-PU) for motion parameter inheritance (MPI) in a depth prediction unit (depth PU) (170). The depth PU may be one or more sub-PUs. Each sub-PU may have equal size. Further, distinct motion information can be inherited for each sub-PU from a texture block co-located to the respective sub-PU. Depth processing unit 125 of video encoder 20 may encode each sub-PU of the depth block based at least in part based at least in part on MPI corresponding to texture blocks co-located with each of the sub-PUs (172). Depth processing unit 125 of video encoder 20 may further generate a syntax element that indicates the size of each sub-PU for MPI in the depth PU (174). In some examples, the syntax element has a range of 0 to 3 inclusive.

If the value of the syntax element is greater than or equal to 1, depth processing unit 125 of video encoder 20 may encode each texture block in an access unit, and perform motion compression with respect to a 16×16 block on each texture block. The access unit includes the depth block. In some examples, each texture block in the access unit may be coded independently relative to a corresponding co-located depth block in the access unit. Each texture block may be encoded before encoding any of the depth blocks in the access unit, and depth processing unit 125 of video decoder 20 may perform motion compression before encoding each of the depth blocks in the access unit.

If the value of the syntax element is equal to 0, then depth processing unit 125 of video encoder 20 may determine that the MPI size is 8×8. In such examples, depth processing unit 125 of video encoder 20 may determine whether the co-located texture block contains two PUs. Responsive to determining that the co-located texture block contains two PUs, depth processing unit 125 of video encoder 20 may determine whether a size of each PU in the co-located texture block is 4×8 or 8×4, partition the sub-PU into two smaller units such that the size of each partition is equal to the size of each PU in the co-located texture block, and uni-directional motion compensation on each of the two smaller units. Further, encoding the sub-PU may include depth processing unit 125 of video encoder 20 inheriting two motion vectors corresponding to RefPicList0.

While the above examples describe consequences of the syntax element having particular values, these consequences may be realized for other values of the syntax element. For example, if the value of the syntax element is equal to 0, then depth processing unit 125 of video encoder 20 may encode each texture block in an access unit, and perform motion compression with respect to a 16×16 block on each texture block. Further, if the value of the syntax element is greater than or equal to 1, then depth processing unit 125 of video encoder 20 may determine that the MPI size is 8×8. Also, while these techniques are described with respect to blocks of particular sizes (i.e., 16×16 or 8×8 blocks), in other examples, the blocks may have different sizes, such as 4×4, 32×32, or 4×8, among other possible sizes.

In some examples, the syntax element may be generated in a sequence parameter set (SPS). In these examples, the depth block may include a plurality of depth PUs and may be one of a plurality of depth blocks in an access unit. The syntax element may further indicate the MPI size for each sub-PU of each depth PU in each respective depth block in the access unit. In such a case, encoding the sub-PU may include depth processing unit 125 of video encoder 20 determining that the depth PU is in a first set of depth PUs, wherein each depth PU in the first set of depth PUs has a size that is less than a square of a sum of 3 and the value of the syntax element after a bitwise left shift of 1 and encoding each sub-PU in the depth PU based at least in part on MPI corresponding to texture blocks co-located with each of the sub-PUs. In some examples, the depth PU may be a first depth PU. In these examples, depth processing unit 125 of video encoder 20 may further determine that a second depth PU is in a second set of depth PUs, wherein each depth PU in the second set of depth PUs has a size that is greater than or equal to the square of the sum of 3 and the value of the syntax element after a bitwise left shift of 1 and encode each sub-PU of the second depth PU using MPI not based on the MPI size.

Figure 11:
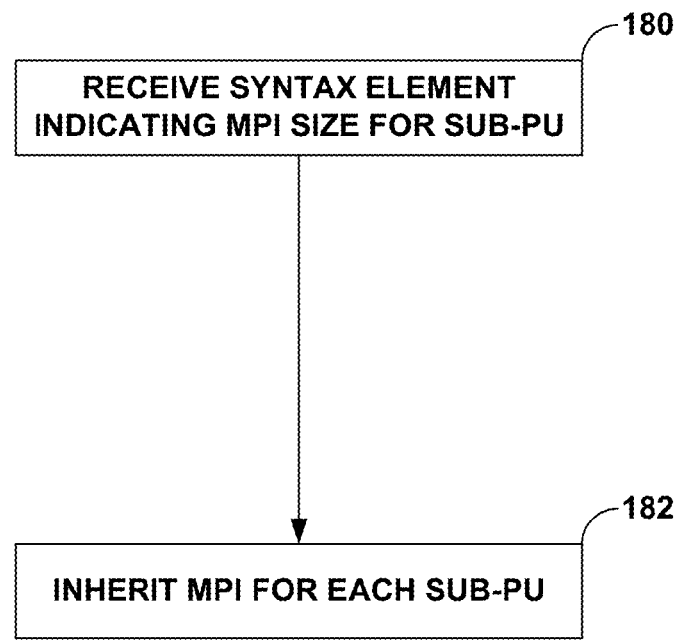
FIG. 11 is a flow diagram illustrating an example decoding technique in accordance with this disclosure.

FIG. 11 is a flow diagram illustrating an example decoding technique in accordance with this disclosure. For example, depth processing unit 165 of video decoder 30 may receive a syntax element that indicates a size of a sub-prediction unit (sub-PU) for motion parameter inheritance (MPI) in a depth prediction unit (depth PU) (180). The depth PU may be one or more sub-PUs. Each sub-PU may have a size equal to the size indicated by the syntax element. Further, distinct motion information can be inherited for each sub-PU from a texture block co-located to the respective sub-PU. Upon receiving an index value that indicates a sub-PU MPI mode, depth processing unit 165 of video decoder 30 may further inherit MPI for each of the sub-PUs of the depth block based at least in part on corresponding texture blocks co-located with each of the sub-PUs (182). In some examples, the syntax element has a range of 0 to 3 inclusive.

If the value of the syntax element is greater than or equal to 1, depth processing unit 165 of video decoder 30 may decode each texture block in an access unit, and perform motion compression with respect to a 16×16 block on each texture block. The access unit includes the depth block. In some examples, each texture block in the access unit may be coded independently relative to a corresponding co-located depth block in the access unit. Each texture block may be decoded before decoding any of the depth blocks in the access unit, and depth processing unit 165 of video decoder 30 may perform motion compression after decoding each of the depth blocks in the access unit.

If the value of the syntax element is equal to 0, then depth processing unit 165 of video decoder 30 may determine that the MPI size is 8×8. In such examples, depth processing unit 165 of video decoder 30 may determine whether the co-located texture block contains two PUs. Responsive to determining that the co-located texture block contains two PUs, depth processing unit 165 of video decoder 30 may determine whether a size of each PU in the co-located texture block is 4×8 or 8×4, partition the sub-PU into two smaller units such that the size of each partition is equal to the size of each PU in the co-located texture block, and uni-directional motion compensation on each of the two smaller units. Further, decoding the sub-PU may include depth processing unit 165 of video decoder 30 inheriting two motion vectors corresponding to RefPicList0.

While the above examples describe consequences of the syntax element having particular values, these consequences may be realized for other values of the syntax element. For example, if the value of the syntax element is equal to 0, then depth processing unit 165 of video decoder 30 may decode each texture block in an access unit, and perform motion compression with respect to a 16×16 block on each texture block. Further, if the value of the syntax element is greater than or equal to 1, then depth processing unit 165 of video decoder 30 may determine that the MPI size is 8×8. Also, while these techniques are described with respect to blocks of particular sizes (i.e., 16×16 or 8×8 blocks), in other examples, the blocks may have different sizes, such as 4×4, 32×32, or 4×8, among other possible sizes.

In some examples, the syntax element may be received in a sequence parameter set (SPS). In these examples, the depth block may include a plurality of depth PUs and may be one of a plurality of depth blocks in an access unit. The syntax element may further indicate the MPI size for each sub-PU of each depth PU in each respective depth block in the access unit. In such a case, inheriting MPI for each sub-PU may include depth processing unit 165 of video decoder 30 determining that the depth PU is in a first set of depth PUs, wherein each depth PU in the first set of depth PUs has a size that is less than a square of a sum of 3 and the value of the syntax element after a bitwise left shift of 1 and inheriting MPI for each sub-PU in the depth PU based at least in part on corresponding texture blocks co-located with each of the sub-PUs. In some examples, the depth PU may be a first depth PU. In these examples, depth processing unit 165 of video decoder 30 may further determine that a second depth PU is in a second set of depth PUs, wherein each depth PU in the second set of depth PUs has a size that is greater than or equal to the square of the sum of 3 and the value of the syntax element after a bitwise left shift of 1 and inherit MPI for each sub-PU of the second depth PU not based on the MPI size.

In one or more examples, the functions described herein may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

The invention claimed is:

1. A method of decoding a depth block, the method comprising:
   receiving a syntax element that indicates a size of a sub-prediction unit (sub-PU) for motion parameter inheritance (MPI) in a depth prediction unit (depth PU), wherein the depth PU comprises one or more sub-PUs, wherein each sub-PU has a size equal to the size indicated by the syntax element, and wherein distinct motion information can be inherited for each sub-PU from a texture block co-located to the respective sub-PU; and
   upon receiving an index value that indicates a sub-PU MPI mode, inheriting MPI for each of the sub-PUs of the depth block based at least in part on corresponding texture blocks co-located with each of the sub-PUs.

2. The method of claim 1, wherein the syntax element is received in a sequence parameter set (SPS).

3. The method of claim 2, wherein the depth block includes a plurality of depth PUs, wherein the depth block is one of a plurality of depth blocks in an access unit, and wherein the syntax element further indicates a MPI size for each sub-PU of each depth PU in each respective depth block in the access unit.

4. The method of claim 3, wherein inheriting MPI for each sub-PU based at least in part on corresponding texture blocks co-located with each of the sub-PUs comprises:
 determining that the depth PU is in a first set of depth PUs, wherein each depth PU in the first set of depth PUs has a size that is less than a square of a sum of 3 and the value of the syntax element after a bitwise left shift of 1; and
 inheriting MPI for each sub-PU in the depth PU based at least in part on corresponding texture blocks co-located with each of the sub-PUs.

5. The method of claim 4, wherein the depth PU is a first depth PU, the method further comprising:
 determining that a second depth PU is in a second set of depth PUs, wherein each depth PU in the second set of depth PUs has a size that is greater than or equal to the square of the sum of 3 and the value of the syntax element after a bitwise left shift of 1; and
 inheriting MPI for each sub-PU of the second depth PU not based on the MPI size.

6. The method of claim 1, wherein the value of the syntax element is greater than or equal to 1, the method further comprising:
 decoding each texture block in an access unit, wherein the access unit includes the depth block; and
 performing motion compression with respect to a 16×16 block on each texture block.

7. The method of claim 6, wherein each texture block in the access unit is coded independently relative to a corresponding co-located depth block in the access unit, wherein each texture block is decoded before decoding any of the depth blocks in the access unit, and wherein motion compression is performed after decoding each of the depth blocks in the access unit.

8. The method of claim 1, wherein the value of the syntax element is 0, the method further comprising:
 determining that the MPI size is 8×8.

9. The method of claim 8, further comprising:
 determining whether the co-located texture block contains two PUs; and
 responsive to determining that the co-located texture block contains two PUs:
  determining whether a size of each PU in the co-located texture block is 4×8 or 8×4;
  partitioning the sub-PU into two smaller units such that the size of each partition is equal to the size of each PU in the co-located texture block; and
  applying uni-directional motion compensation on each of the two smaller units.

10. The method of claim 9, wherein decoding the sub-PU comprises inheriting two motion vectors corresponding to RefPicList0.

11. The method of claim 1, wherein the syntax element has a range of 0 to 3 inclusive.

12. A device for decoding a depth block, the device comprising:
 a memory configured to store data associated with the depth block; and
 one or more processors configured to:
  receive a syntax element that indicates a size of a sub-prediction unit (sub-PU) for motion parameter inheritance (MPI) in a depth prediction unit (depth PU), wherein the depth PU comprises one or more sub-PUs, wherein each sub-PU has a size equal to the size indicated by the syntax element, and wherein distinct motion information can be inherited for each sub-PU from a texture block co-located to the respective sub-PU; and
  upon receiving an index value that indicates a sub-PU MPI mode, inheriting MPI for each of the sub-PUs of the depth block based at least in part on corresponding texture blocks co-located with each of the sub-PUs.

13. The device of claim 12,
 wherein the syntax element is received in a sequence parameter set (SPS),
 wherein the depth block includes a plurality of depth PUs,
 wherein the depth block is one of a plurality of depth blocks in an access unit,
 wherein the syntax element further indicates a MPI size for each sub-PU of each depth PU in each respective depth block in the access unit,
 wherein the depth PU is a first depth PU,
 wherein the one or more processors being configured to decode the sub-PU based at least in part on the MPI size comprises the one or more processors being configured to:
  determine that the first depth PU is in a first set of depth PUs, wherein each depth PU in the first set of depth PUs has a size that is less than a square of a sum of 3 and the value of the syntax element after a bitwise left shift of 1; and
  decode each sub-PU in the first depth PU based at least in part on the MPI size, and
 wherein the one or more processors are further configured to:
  determining that a second depth PU is in a second set of depth PUs, wherein each depth PU in the second set of depth PUs has a size that is greater than or equal to the square of the sum of 3 and the value of the syntax element after a bitwise left shift of 1; and
  decoding each sub-PU of the second depth PU using MPI not based on the MPI size.

14. The device of claim 12, wherein the value of the syntax element is greater than or equal to 1, wherein the one or more processors are further configured to:
 decode each texture block in an access unit, wherein the access unit includes the depth block; and
 perform motion compression with respect to a 16×16 block on each texture block.

15. The device of claim 14, wherein each texture block in the access unit is coded independently relative to a corresponding co-located depth block in the access unit, wherein each texture block is decoded before decoding any of the depth blocks in the access unit, and wherein motion compression is performed after decoding each of the depth blocks in the access unit.

16. A method of encoding a depth block, the method comprising:
 determining a size of a sub-prediction unit (sub-PU) for motion parameter inheritance (MPI) in a depth prediction unit (depth PU), wherein the depth PU comprises one or more sub-PUs, wherein each sub-PU has equal size, and wherein distinct motion information can be inherited for each sub-PU from a texture block co-located to the respective sub-PU;

encoding each sub-PU of the depth block based at least in part on MPI corresponding to texture blocks co-located with each of the sub-PUs; and generating a syntax element that indicates the size of each sub-PU for MPI in the depth PU.

17. The method of claim 16, wherein the syntax element is generated in a sequence parameter set (SPS).

18. The method of claim 17, wherein the depth block includes a plurality of depth PUs, wherein the depth block is one of a plurality of depth blocks in an access unit, and wherein the syntax element further indicates a MPI size for each sub-PU of each depth PU in each respective depth block in the access unit.

19. The method of claim 18, wherein encoding the sub-PU based at least in part on MPI corresponding to texture blocks co-located with each of the sub-PUs comprises:

determining that the depth PU is in a first set of depth PUs, wherein each depth PU in the first set of depth PUs has a size that is less than a square of a sum of 3 and the value of the syntax element after a bitwise left shift of 1; and encoding each sub-PU in the depth PU based at least in part on MPI corresponding to texture blocks co-located with each of the sub-PUs.

20. The method of claim 19, wherein the depth PU is a first depth PU, the method further comprising:

determining that a second depth PU is in a second set of depth PUs, wherein each depth PU in the second set of depth PUs has a size that is greater than or equal to the square of the sum of 3 and the value of the syntax element after a bitwise left shift of 1; and encoding each sub-PU of the second depth PU using MPI not based on the MPI size.

21. The method of claim 16, wherein the value of the syntax element is greater than or equal to 1, the method further comprising:

encoding each texture block in an access unit, wherein the access unit includes the depth block; and performing motion compression with respect to a 16×16 block on each texture block.

22. The method of claim 21, wherein each texture block in the access unit is coded independently relative to a corresponding co-located depth block in the access unit, wherein each texture block is encoded before encoding any of the depth blocks in the access unit, and wherein motion compression is performed before encoding each of the depth blocks in the access unit.

23. The method of claim 16, wherein the value of the syntax element is 0, the method further comprising:

determining that the MPI size is 8×8.

24. The method of claim 23, further comprising:

determining whether the co-located texture block contains two PUs; and responsive to determining that the co-located texture block contains two PUs:

determining whether a size of each PU in the co-located texture block is 4×8 or 8×4;

partitioning the sub-PU into two smaller units such that the size of each partition is equal to the size of each PU in the co-located texture block; and applying uni-directional motion compensation on each of the two smaller units.

25. The method of claim 24, wherein encoding the sub-PU comprises inheriting two motion vectors corresponding to RefPicList0.

26. The method of claim 16, wherein the syntax element has a range of 0 to 3 inclusive.

27. A device for encoding a depth block, the device comprising:

a memory configured to store data associated with the depth block; and one or more processors configured to:

determine a size of a sub-prediction unit (sub-PU) for motion parameter inheritance (MPI) in a depth prediction unit (depth PU), wherein the depth PU comprises one or more sub-PUs, wherein each sub-PU has equal size, and wherein distinct motion information can be inherited for each sub-PU from a texture block co-located to the respective sub-PU;

encode each sub-PU of the depth block based at least in part on MPI corresponding to texture blocks co-located with each of the sub-PUs; and generate a syntax element that indicates the size of each sub-PU for MPI in the depth PU.

28. The device of claim 27, wherein the syntax element is generated in a sequence parameter set (SPS), wherein the depth block includes a plurality of depth PUs, wherein the depth block is one of a plurality of depth blocks in an access unit, wherein the syntax element further indicates a MPI size for each sub-PU of each depth PU in each respective depth block in the access unit, wherein the depth PU is a first depth PU, wherein the one or more processors being configured to encode the sub-PU based at least in part on the MPI size comprises the one or more processors being configured to:

determine that the first depth PU is in a first set of depth PUs, wherein each depth PU in the first set of depth PUs has a size that is less than a square of a sum of 3 and the value of the syntax element after a bitwise left shift of 1; and encode each sub-PU in the first depth PU based at least in part on the MPI size, and wherein the one or more processors are further configured to:

determine that a second depth PU is in a second set of depth PUs, wherein each depth PU in the second set of depth PUs has a size that is greater than or equal to the square of the sum of 3 and the value of the syntax element after a bitwise left shift of 1; and encode each sub-PU of the second depth PU using MPI not based on the MPI size.

29. The device of claim 27, wherein the value of the syntax element is greater than or equal to 1, wherein the one or more processors are further configured to:

encode each texture block in an access unit, wherein the access unit includes the depth block; and perform motion compression with respect to a 16×16 block on each texture block.

30. The device of claim 29, wherein each texture block in the access unit is coded independently relative to a corresponding co-located depth block in the access unit, wherein each texture block is encoded before encoding any of the depth blocks in the access unit, and wherein motion compression is performed before encoding each of the depth blocks in the access unit.

* * * * *